United States Patent
Witt et al.

(10) Patent No.: US 6,189,087 B1
(45) Date of Patent: *Feb. 13, 2001

(54) SUPERSCALAR INSTRUCTION DECODER INCLUDING AN INSTRUCTION QUEUE

(75) Inventors: David B. Witt, Austin, TX (US); Michael D. Goddard, Windlesham (GB)

(73) Assignee: Advanced Micro Devices, Inc., Sunnyvale, CA (US)

(*) Notice: Under 35 U.S.C. 154(b), the term of this patent shall be extended for 0 days.

This patent is subject to a terminal disclaimer.

(21) Appl. No.: 08/906,730

(22) Filed: Aug. 5, 1997

Related U.S. Application Data

(63) Continuation of application No. 08/628,389, filed on Apr. 5, 1996, now abandoned, which is a continuation of application No. 08/146,383, filed on Oct. 29, 1993, now abandoned.

(51) Int. Cl.[7] .................................................. G06F 9/38
(52) U.S. Cl. ........................ 712/208; 712/209; 712/212; 712/215
(58) Field of Search .................................... 712/204, 206, 712/207, 208, 209, 212, 213, 214, 215, 23, 24, 41

(56) References Cited

U.S. PATENT DOCUMENTS

| 3,781,808 | 12/1973 | Ahearn et al. ........................ 711/207 |
| 4,044,338 | 8/1977 | Wolf ........................................ 365/49 |

(List continued on next page.)

FOREIGN PATENT DOCUMENTS

| 0259095 A2 | 3/1988 | (EP) . |
| 0380854 A3 | 8/1990 | (EP) . |

(List continued on next page.)

OTHER PUBLICATIONS

Mike Johnson, "Superscalar Microprocessor Design", (Prentice Hall series in innovative technology), 1991, pp. 129–130, 133–134, A 261–272.

(List continued on next page.)

*Primary Examiner*—Viet D. Vu
(74) *Attorney, Agent, or Firm*—Skjerven, Morrill, MacPherson, Franklin & Friel, LLP; Stephen A. Terrile

(57) ABSTRACT

A superscalar complex instruction set computer ("CISC") processor having a reduced instruction set computer ("RISC") superscalar core includes an instruction cache which identifies and marks raw x86 instruction start and end points and encodes "pre-decode" information, a byte queue which is a queue of aligned instruction and pre-decode information of the "predicted executed" state, and an instruction decoder which generates type, opcode, and operand pointer values for RISC-like operations (ROPs) based on the aligned pre-decoded x86 instructions in the byte queue and determines the number of possible x86 instruction dispatch for shifting the byte que. The instruction decoder includes in each dispatch position a logic conversion path, a memory conversion path, and a common conversion path for converting CISC instructions to ROPs. An ROP multiplexer directs x86 instructions from the byte queue to the conversion paths, a select circuit assembles ROP information from the appropriate conversion paths, and a shared circuit processes ROP information from the select circuit for shared resources. ROP type and opcode information is dispatched from the instruction decoder to the RISC core. Pointers to the A and B source operands are furnished by the instruction decoder to a register file and to a reorder buffer in the RISC core, which in turn furnish the appropriate "predicted executed" versions of the A and B operands to various functional units in the RISC core in coordination with the ROP type and opcode information.

34 Claims, 16 Drawing Sheets

U.S. PATENT DOCUMENTS

| | | | |
|---|---|---|---|
| 4,161,784 | 7/1979 | Cushing et al. | 708/513 |
| 4,502,111 | 2/1985 | Riffe et al. | 712/204 |
| 4,736,288 | 4/1988 | Shintani et al. | 712/217 |
| 4,807,115 | 2/1989 | Torng | 712/215 |
| 4,858,105 | 8/1989 | Kuriyama et al. | 712/235 |
| 4,926,322 | 5/1990 | Stimac et al. | 395/500.44 |
| 4,928,223 | 5/1990 | Dao et al. | 712/247 |
| 4,992,934 | 2/1991 | Portanovo et al. | 712/209 |
| 5,056,006 | 10/1991 | Acharya et al. | 711/147 |
| 5,101,341 | 3/1992 | Circello et al. | 712/213 |
| 5,128,888 | 7/1992 | Tamura et al. | 708/508 |
| 5,129,067 | 7/1992 | Johnson | 712/213 |
| 5,131,086 | 7/1992 | Circello et al. | 712/213 |
| 5,136,697 | 8/1992 | Johnson | 712/239 |
| 5,155,816 | 10/1992 | Kohn | 712/205 |
| 5,155,817 | 10/1992 | Kishigami et al. | 712/218 |
| 5,155,820 | 10/1992 | Gibson | 712/210 |
| 5,185,868 | 2/1993 | Tran | 712/217 |
| 5,222,230 | 6/1993 | Gill et al. | 713/600 |
| 5,226,126 | 7/1993 | McFarland et al. | 712/218 |
| 5,226,130 | 7/1993 | Favor et al. | 712/238 |
| 5,233,694 | 8/1993 | Hotta et al. | 712/215 |
| 5,233,696 | 8/1993 | Suzuki | 712/204 |
| 5,251,306 | 10/1993 | Tran | 712/217 |
| 5,337,415 | 8/1994 | DeLano et al. | 712/213 |
| 5,390,355 | 2/1995 | Horst | 712/206 |
| 5,438,668 | 8/1995 | Coon et al. | 712/204 |
| 5,465,373 | 11/1995 | Kahle et al. | 712/215 |
| 5,488,710 | 1/1996 | Sato et al. | 711/125 |
| 5,497,496 | 3/1996 | Ando | 712/23 |
| 5,513,330 | 4/1996 | Stiles | 712/204 |
| 5,632,023 | 5/1997 | White et al. | 712/218 |
| 5,651,125 | 7/1997 | Witt et al. | 712/218 |

FOREIGN PATENT DOCUMENTS

| | | |
|---|---|---|
| 0381471 A2 | 8/1990 | (EP) . |
| 0454984 A2 | 11/1991 | (EP) . |
| 0454985 A2 | 11/1991 | (EP) . |
| 0459232 A2 | 12/1991 | (EP) . |
| 0498654 A3 | 8/1992 | (EP) . |
| 0506972 A1 | 10/1992 | (EP) . |
| 0533337 | 3/1993 | (EP) . |
| 2263895 | 8/1993 | (GB) . |
| 2263987 | 8/1993 | (GB) . |
| 2 281 422 | 3/1995 | (GB) . |
| 93/01546 | 1/1993 | (WO) . |
| 93/20507 | 10/1993 | (WO) . |

OTHER PUBLICATIONS

U.S. Patent Application Serial No. 07/929,770 filed Apr. 12, 1992 entitled "Instruction Decoder and Superscalar Processor Utilizing Same" —David B. Witt and William M. Johnson.

D.W. Anderson, F.J. Sparacio, F.M. Tomasulo, The IBM System/360 Model 91: Machine Philosophy and Instruction–handling[1], chapter 18, Part 2 Regions of Computer Space, Section 3 Concurrency: Single–Processor Systems, IBM Journal, vol. 11, Jan. 1967, pp. 276–292.

Michael Slater, "AMD's K5 Designed to Outrun Pentium", *Microprocessor Report*, Oct. 24, 1994, pp. 1, 6–11.

"System/370 Emulator Assist Processor for a Reduced Instruction Set Computer", IBM Technical Disclosure Bulletin, vol. 30, No. 10, Mar. 1988, pp. 308–309.

Shreekant S. Thakkar and William E. Hostmann, "An Instruction Pitch Unit for a Graph Reduction Machine", IEEE © 1986, pp. 82–91.

Toyohiko Yoshida, et al, "The Approach to Multiple Instruction Execution in the GMICRO/400 Processor", ©1991, IEEE, pp. 185–195.

Tom R. Halfhill, "AMD K6 Takes on Intel P6", *BYTE* magazine, Jan. 1996, pp. 67–68, 70, and 72.

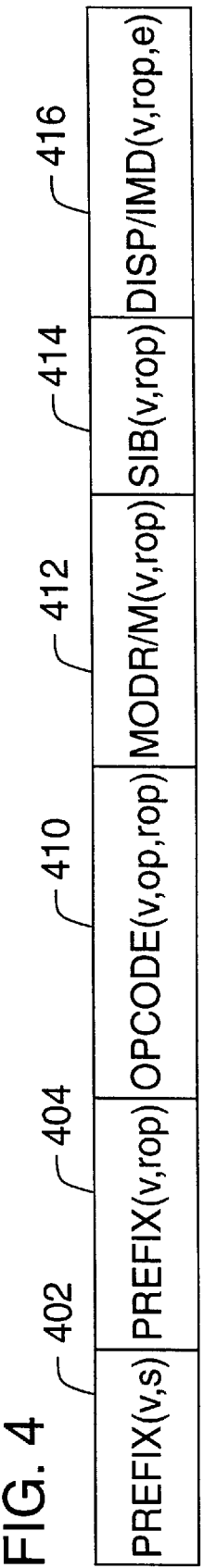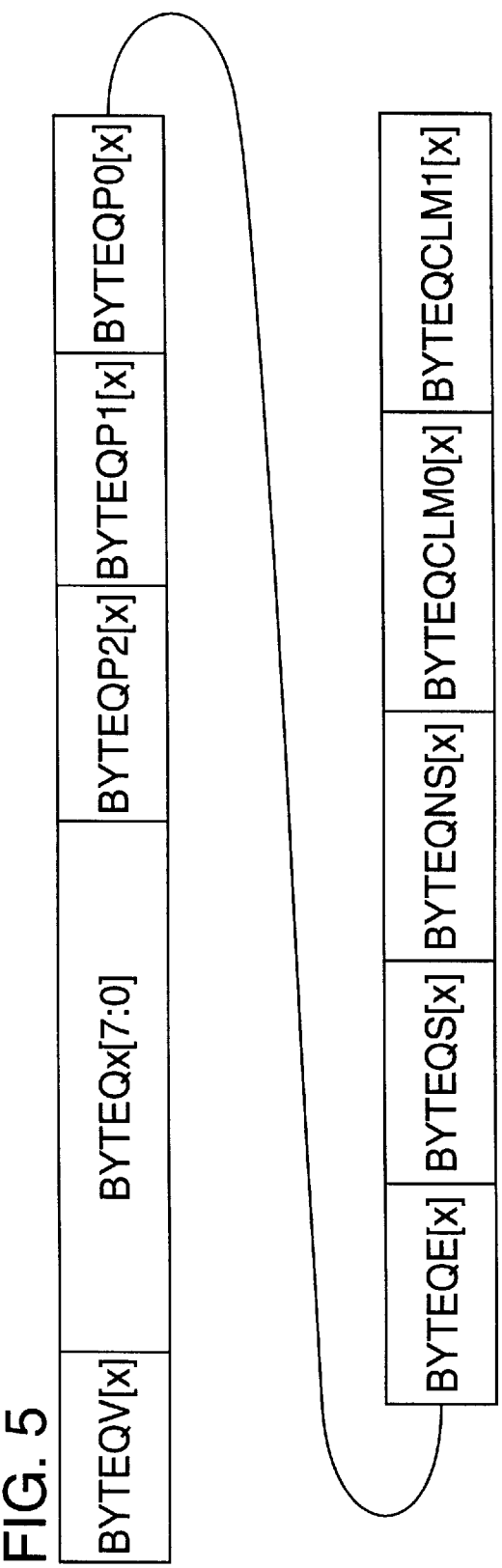
FIG. 4
FIG. 5

SUPERSCALAR INSTRUCTION DECODER INCLUDING AN INSTRUCTION QUEUE

This application is a continuation of U.S. patent application Ser. No. 08/628,389 filed Apr. 5, 1996, entitled "METHOD AND APPARATUS FOR DECODING ONE OR MORE COMPLEX INSTRUCTIONS INTO CONCURRENTLY DISPATCHED SIMPLE INSTRUCTIONS" and naming David W. Witt and Michael D. Goddard as inventors, now abandoned, which is itself a continuation of U.S. patent application Ser. No. 08/146,383 filed Oct. 29, 1993, now abandoned. U.S. patent application Ser. No. 08/628,389 is incorporated herein, in its entirety, by reference.

BACKGROUND OF THE INVENTION

1. Field of the Invention

The invention relates to microprocessor architecture, and more particularly to superscalar instruction decoder architecture.

2. Description of Related Art

General purpose processors typically are based on scalar instruction sets. Processor architectures are either RISC (Reduced Instruction Set Computer) -based or CISC (Complex Instruction Set Computer) -based. Each approach has its advantages and disadvantages, as has been widely discussed in the literature.

The term "superscalar" describes a computer implementation that improves performance by concurrent execution of scalar instructions. Progress in implementing superscalar RISC architectures has been good. Scalar RISC architectures typically are defined with a pipelined implementation in mind, and include many features which facilitate superscalar implementation. These features include a fixed format and fixed length instructions, explicit instruction operands, and a load/store architecture. Superscalar RISC architectures are described in Johnson, Superscalar Microprocessor Design, Prentice Hall, Englewood Cliffs, N.J., 1991, which is incorporated herein by reference in its entirety.

Although interest has been expressed in achieving superscalar CISC architectures, progress has been hindered in part because few CISC architectures were defined with superscalar implementation in mind. CISC architectures were defined at a time when the principal implementation technique was microcode interpretation of the instruction set, with an emphasis on deciding which operations should be combined into instructions rather than designing operations so that they could be overlapped. While enormously versatile, microcode interpretation does not facilitate development of pipelined architectures or superscalar architectures. Difficulties arise from numerous aspects of conventional CISC architectures, including instruction format complexity, frequent register reuse, frequent memory access, and the inclusion of unusually complex instructions.

An example of a CISC instruction format is the instruction format of the Intel i486™ microprocessor, which is available from Intel Corporation of Santa Clara, Calif. In this instruction format, an instruction may have an operation code ("opcode") consisting of one or two opcode bytes, a modify register or memory ("mod r/m") byte, a scale-index-base ("sib") byte, displacement bytes, and immediate date bytes. The opcode specifies the operation code, and may also contain a register identifier. The mod r/m byte specifies whether an operand is in a register or in memory. If the operand is in memory, fields in the mod r/m byte specify the addressing mode to be used. Certain encodings of the mod r/m byte indicate that a second byte, the sib byte, follows to fully specify the addressing mode. The sib byte consists of a 2-bit scale field, a 3-bit index field, and a 3-bit base field. These fields are used in complex memory addressing modes to specify how address computation is done. The displacement byte is used in address computation. The immediate data byte is used for an instruction operand. One or more additional bytes, known as prefix bytes, may appear before the opcode byte. The prefix byte changes the interpretation of the instruction, adding additional complexity. The length of the instruction can vary as well. The mninimum instruction consists of a single opcode byte and is 8 bits long. A long instruction that includes a prefix byte may be 104 bits long. Longer instructions containing more than a single prefix byte are possible as well.

An example of a recent microprocessor having a CISC superscalar architecture is the Pentium™ microprocessor, available form Intel Corporation of Santa Clara, Calif. The improved performance of the Pentium microprocessor relative to the i486 microprocessor is due in part to its superscalar architecture. Unfortunately, even new superscalar CISC architectures such as the Pentium microprocessor remain limited by various aspects of conventional CISC architectures, including instruction format complexity, frequent register reuse, frequent memory access, and the inclusion of unusually complex instructions.

SUMMARY OF THE INVENTION

Improved processor performance is facilitated by the present invention, which in one embodiment is a method for instruction decoding in which the CISC opcodes and addressing information of CISC instructions which map to respective numbers of RISC-like operations (ROPs) are identified and aligned into dispatch positions based on the number of ROPs to which the instructions map. ROP opcodes and addressing information are decoded from the CISC opcodes and addressing information based on, for each CISC instruction, the position of a dispatch position decoding the CISC instruction relative to other dispatch positions decoding the same CISC instruction. The ROP opcode and addressing information from the dispatch positions is driven in parallel to a RISC core.

Other embodiments of the invention include means for carrying out the foregoing method.

Another embodiment of the invention is an apparatus for dispatching up to a plurality "m" of ROPs in parallel, wherein the ROPs are mapped from one or more CISC instructions. The apparatus includes a memory for storing a CISC instruction and pre-decode information, which includes a value identifying the number of ROPs to which the CISC instruction maps. A multiplexer having a plurality "m" of outputs is coupled to the memory for directing information from the CISC instruction to unallocated ones of the multiplexer outputs equal to the number of ROPs to which the CISC instruction maps, up to "m" ROPs. A plurality of conversion paths are respectively coupled to the multiplexer outputs for converting the CISC instruction information into respective ROPs to which the CISC instruction maps. Dispatch logic is coupled to the conversion paths for dispatching the ROPs in a current dispatch window.

In another embodiment, the simple and common CISC instructions are encoded into one to three ROP sequences of primitive ROPs, which are then dispatched in parallel. The encoding is done for each dispatch position in a "fastpath," which decodes a CISC instruction into an ROP and dispatches it to the RISC core. The fastpath uses pre-decoded information accompanying each CISC instruction byte to determine where instruction boundaries are and the number of ROPs for each CISC instruction.

In another embodiment, complicated instructions, ie., those requiring four or more ROPs, and infrequently used instructions are encoded using an entrypoint into microcode ROM. At the entrypoint, no additional CISC instructions are issued, so that the full issue width is available for the complex instruction. The ROPs from microcode ROM are dispatched from the four dispatch positions.

BRIEF DESCRIPTION OF THE DRAWINGS

FIG. 4 is a pictorial representation of a pre-decoded x86 instruction suitable for storage in a byte queue of the processor of FIG. 1.

FIG. 5 is a pictorial representation of an element of the pre-decoded x86 instruction of FIG. 4.

DESCRIPTION OF THE PREFERRED EMBODIMENT

Figure 1:
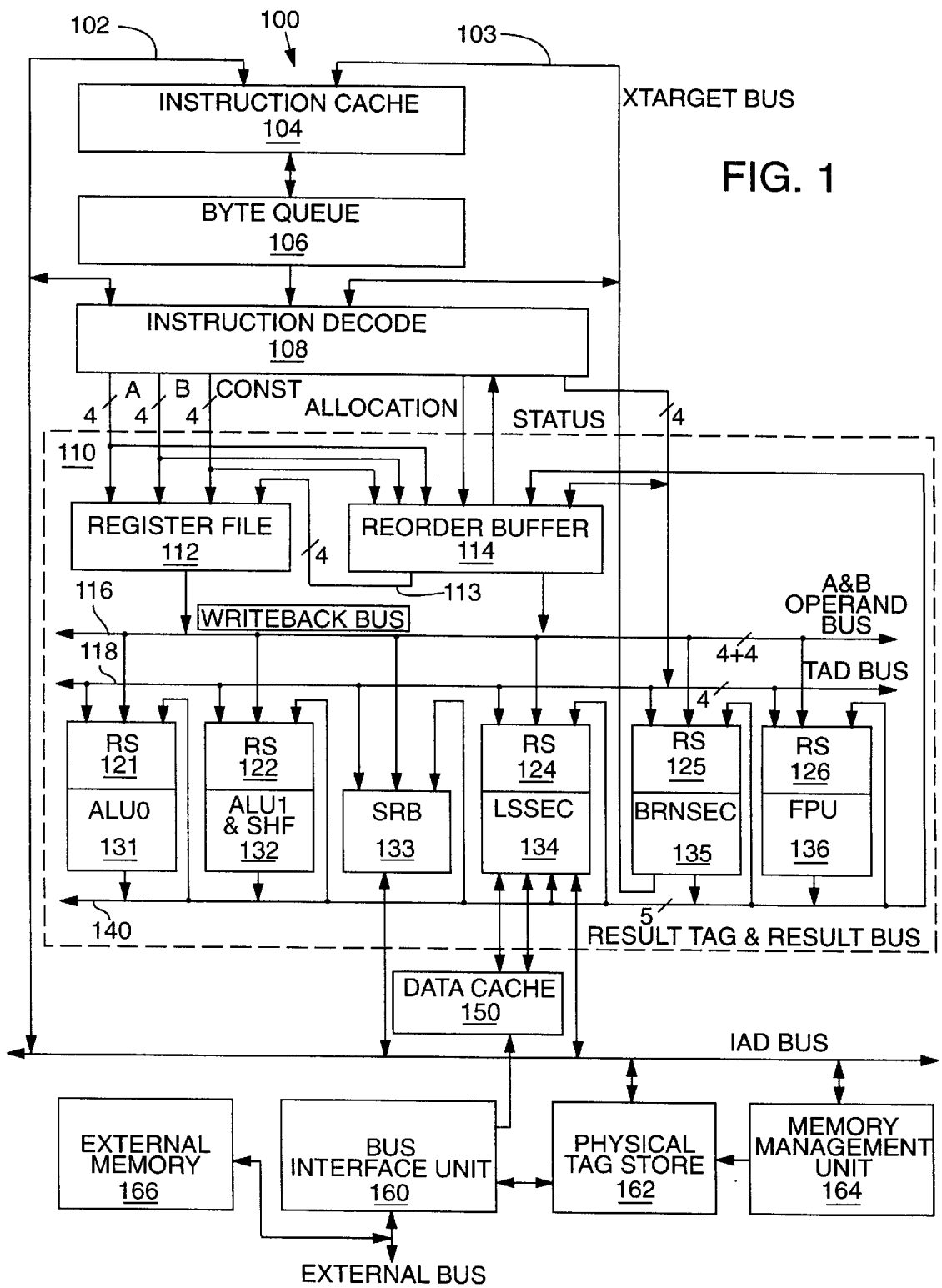
FIG. 1 is a architecture-level block diagram of a processor for achieving superscalar execution of a CISC instruction set.

The architecture of a processor 100 for achieving a superscalar execution of a CISC instruction set is shown in FIG. 1. The CISC addresses, data, and control transfers between the major functional blocks of the processor 100 as well as to and from external memory are communicated on an internal address and data ("IAD") bus 102, which is interfaced to an external bus (not show) by a bus interface unit ("BIU") 160 in conjunction with a physical tag store 162 and a memory management unit 164. The IAD bus 102 is a 64-bit bus. Another bus called the transfer target bus, or XTARGET bus 103, is a 32-bit bus with various prioritized uses, including updating the IDECODE 108 from the branch section BRNSEC 135 in the event of microbranch misprediction, exceptions, and resets; and updating a branch FIFO in the BRNSEC 135 from the IDECODE.

The CISC instructions, illustratively instructions used by x86 class microprocessors (hereinafter x86 instructions), are parsed and pre-decoded in an instruction cache ("ICACHE") 104, the pre-decoded x86 instructions are copied to a byte queue ("BYTEQ") 106, and the pre-decoded x86 instructions are mapped in an instruction decoder ("IDECODE") 108 to respective sequences of instructions for RISC-like operations ("ROPs"). These ROPs have a number of useful characteristics, including a "source A—operation—source B→destination" structure, fixed location of opcode and source operands, suitability for load/store architectures, and direct calculation of load/store addressing modes.

The ROPs for the RISC core 110 are three operand instructions: two source operands A and B, and one destination operand. The main ROP fields are listed in Table 1.

TABLE 1

| BITS | FIELD | SUB-FIELD BITS | DESCRIPTION |
| --- | --- | --- | --- |
| 58:56 | FU | | Three bit field specifies the functional unit to which the ROP is to be dispatched. |
| 55:48 | OPCODE | 53:48 | Actual Opcode. Six bit subfield specifies the opcode to be sent to the functional units. |
| | | 55:54 | Extra Operand Size Information. Two bit subfield specifies extra operand size information for floating point ROPs. |
| 47:40 | DEST | 47:43 | Register Specification. Five bit subfield either directly specifies a register number, or specifies the x86 instruction field containing the register number. |
| | | 42:40 | Operand Size. Three bit subfield either directly specifies the size of the operand (8-bit high byte, 8-bit low byte, 16-bit, or 32-bit), or specifies how to determine the size from decode information such as segment attributes and instruction prefixes. |
| 39:32 | SOURCE A | | Can be used for half of a 16-bit immediate operand when combined with SOURCE B. |
| | | 39:35 | Register Specification. Five bit subfield either directly specifies a register number, or specifies the x86 instruction field containing the register number. |
| | | 34:32 | Operand Size. Three bit subfield either directly specifies the size of the operand (8-bit high byte, 8-bit low byte, 16-bit, or 32-bit), or specifies how to determine the size from decode information such as segment attributes and instruction prefixes. |
| 31:24 | SOURCE B | | Can be used for 8-bit immediate operand, or for half of a 16-bit immediate operand when combined with SOURCE A. |
| | | 31:27 | Register Specification. Five bit subfield either directly specifies a register number, or specifies the x86 instruction field containing the register number. |
| | | 26:24 | Operand Size. Three bit subfield either directly specifies the size of the operand (8-bit high byte, 8-bit low byte, 16-bit, or 32-bit), or specifies how to determine the size from decode information such as segment attributes and instruction prefixes. |

TABLE 1-continued

| BITS | FIELD | SUB-FIELD BITS | DESCRIPTION |
|---|---|---|---|
| 23:16 | OPERAND TYPE | | Eight bit field contains additional information about the Destination, Source A, and Source B operands. For all operands, it specifies whether the register is integer, soft special, floating point upper half, or floating point lower half. For the source registers, it additionally specifies whether the Source A or B fields contain register numbers and sizes or immediate data. |
| | | 23:22 | Destination Type. Two bit subfield specifies the destination type. |
| | | 21:19 | Source A Type. Three bit subfield specifies the Source A type. |
| | | 18:16 | Source B Type. Three bit subfield specifies the Source B type. |
| 15:8 | L/S CONTROL | | Eight bit field provides extra control information for load and store ROPs. This information is directed to the load/store functional unit on one of the two INSLS buses when the ROP is dispatched. |
| | | 15 | Displacement. One bit subfield controls whether decode drives the displacement field from the x86 instruction on the FASTCN buses to the load/store functional unit. |
| | | 14 | 32-Bit Addressing. One bit subfield forces use of 32-bit addressing regardless of decoded size. |
| | | 13 | Lock. One bit subfield directs the load/store functional unit to perform a locked memory access. |
| | | 12:8 | Segment Register. Five bit subfield specifies the segment register to use for the access. |
| 7:0 | DISPATCH /ROB | | Eight bit field controls some aspects of dispatching or retiring ROPs, as follows. |
| | | 7 | Serialize. One bit field directs decode to wait until all previous ROPs have been retired before dispatching this ROP. Used for ROPs which use or modify state which is not speculatively managed by the reorder buffer. |
| | | 6 | Scaling. One bit field directs whether scaling is on or off (1-on, 0-off). |
| | | 5 | Backup. One bit field directs the reorder buffer to save a backup copy of certain state when this ROP is retired, in the event of an exception. |
| | | 4 | Interrupt Check. One bit field directs the reorder buffer to check for the presence of an external interrupt when this ROP is retired. |
| | | 3 | Writeback. Indicates that this ROP modifies the register specified by the Destination field, which is used by the reorder buffer for dependency checking and updating of the register file. |
| | | 2:0 | Flag Control. Indicates what bits in the EFLAGS register the ROP modifies. Bit 2 controls OF; bit 1 controls SF, ZF, AF and PF as a group, and bit 0 controls CF. Also used to control Floating Point Status register updates. |

The ICACHE 104 is a first level instruction cache which identifies and marks raw x86 instruction start and end points and encodes "pre-decode" information. The BYTEQ 106 is a queue of instruction and pre-decode information of the "predicted executed" state. The BYTEQ 106 is in effect an interface between the ICACHE 104 and the IDECODE 108, and may be integrated with either, distributed across both, or implemented as a separate unit. Depending on how many ROPs the x86 instructions map to, up to four x86 instructions can be dispatched concurrently. The ICACHE 104 is described in further detail in U.S. patent application Ser. No. 08/145,905 filed Oct. 29, 1993 (David B. Witt and Michael D. Goddard, "Pre-Decode Instruction Cache and Method Therefor Particularly Suitable for Variable Byte-Length Instructions"), which is incorporated herein by reference in its entirety. The BYTEQ 106 is described in flrther detail in U.S. patent application Ser. No. 08/145,902 filed Oct. 29, 1993 (David B. Witt "Speculative Instruction Queue and Method Therefor Particularly Suitable for Variable Byte-Length Instructions"), which is incorporated herein by reference in its entirety.

The IDECODE 108 generates type, opcode, and pointer values for all ROPs based on the pre-decoded x86 instructions in the BYTEQ 106, and determines the number of possible x86 instruction dispatches for shifting the BYTEQ 106. The IDECODE 108 also maintains program counter values of speculatively-executed ROPs, and maintains speculative mapping of floating point pointers for speculative floating point execution.

The ROP instructions are dispatched to a superscalar RISC core 110 over various buses. The RISC core 110 supports four ROP issue, five ROP results, and up to sixteen speculatively executed ROPs. Up to four sets of pointers to the A and B source operands are fuimshed over respective buses by the IDECODE 108 to a register file REGF 112 and to a reorder buffer ROB 114 in the RISC core 110. The REGF 112 and ROB 114 in turn fiunish the appropriate "predicted executed" versions of the RISC operands A and B to various functional units in the RISC core 110 via an A & B source operand bus 116. RISC opcode information is dispatched from the IDECODE 108 via a type and dispatch information ("TAD") bus 118.

The RISC core 110 includes numerous functional units such as a first arithmetic logic unit ("ALU0") 131, a second arithmetic logic and shift unit ("ALU1 & SHF") 132, a special register block ("SRB") 133, a load/store section ("LSSEC") 134, a branch section ("BRNSEC") 135, and a floating point unit ("FPU") 136. It will be appreciated that the functional units may be dedicated to a particular type of function as in the ALU0 131, or may combine a plurality of functions as in the ALU1 & SHF 132 and the LSSEC 134. The functional units 131, 132, 133, 134, 135 and 136 include respective reservation stations 121, 122, 124, 125 AND 126 having inputs connected to the operand bus 116 and the TAD bus 118. The reservation stations allow speculative ROPs to be dispatched to the functional units 131–132 and 134–136 regardless of whether their source operands are currently available.

The REGF 112 is a physical register file which contains the mapped x86 registers for the integer and floating point instructions, and also contains temporary integer and floating point registers for holding intermediate calculations. The REGF 112 decodes up to two register pointers for each of up to four concurrently dispatched ROPs and fiunishes the values of the selected entries onto the A and B source operand bus 116 as appropriate from its eight read ports. The REGF 112 includes four write ports for retiring speculative execution state operands from the ROB 114 over a writeback bus 113. The ROB 114 is a circular FIFO with head and tail queue pointers for keeping track of the relative order of speculatively executed ROPs. The storage locations are dynamically allocated to instruction results. When an instruction is decoded, its result value is allocated a location, or destination, in the ROB 114, and its destination-register number is associated with this location. For a subsequent instruction having no dependencies, the operand bus 116 is driven from the REGF 112. However, when a subsequent instruction has dependencies and refers to the renamed destination register to obtain the value considered to be stored therein, the instruction obtains instead the value stored in the ROB 114, or a tag for the location in the ROB 114 allocated to this value if the value is undetermined. The value or tag is flunished to the functional units over the TAD 118 bus. When results are obtained from completion of execution in the functional units 131–136, the results and their respective result tags are furnished to the ROB 114 over a four bus wide result tag and result bus 140, as well as to the reservation stations 121–122 and 124–126. The ROB 114 also handles exceptions and mispredictions, and maintains the state of certain visible registers, including the program counter and the execution flags. A suitable unit for the RISC core 110 is disclosed in U.S. patent application Ser. No. 08/146,382 filed Oct. 29, 1993, which is incorporated herein by reference in its entirety, and which issued as U.S. Pat. No. 5,651,125. Other suitable RISC cores as well as suitable RISC instruction sets are well known in the art.

The processor 100 of FIG. 1 uses in-order dispatch of ROPs from the IDECODE 108, out-of-order issue with respect to the issue of instructions among the functional units, in-order issue with respect to the issue of instructions to a functional unit from its respective reservation station, and out-of-order completion. Accordingly, the IDECODE 108 is isolated from completion in the functional units of the RISC core 110 so that except for stalls, the IDECODE 108 continues to decode instructions regardless of whether they can be promptly completed. To take advantage of lookahead, the IDECODE 108 decodes instructions and places them into available locations in the reservation stations 121–122 and 124–126 of the functional units 131–132 and 134–136 as long as the reservation stations can receive them.

DCACHE 150 is closely aligned to LSSEC 134, which handles both integer and floating point load and store operations. Up to two load operations simultaneously access the DCACHE 150 and forward their operations to the result bus 140. Cache hit/miss checking for data stored in the DCACHE 150 is also done by the LSSEC 134.

The processor 100 also includes the physical tag store 162, the memory management unit 164, and a bus interface unit 160, which interfaces with a conventional external bus coupled to a conventional external memory 166. The physical tag store 162 contains tags which relate to the contents of the ICACHE 104 and the DCACHE 150. The memory management unit 164 performs memory address conversions. The bus interface unit 160 takes requests for read/write cycles from the physical tag store 162, and watches read/write cycles on the external bus to ensure cache consistency in the physical tag store 162, the ICACHE 104, and the DCACHE 150 and, upon detection, to update, invalidate, or provide data as appropriate. The DCACHE 150 and the LSSEC 134 are flrther described in U.S. patent application Ser. No. 08/146,381, filed Oct. 29, 1993 (David B. Witt, "Linearly Addressed Microprocessor Cache"), which is incorporated herein by reference in its entirety. The physical tag store 162 and the LSSEC 134 are further described in U.S. patent application Ser. No. 08/146,376, filed Oct. 29, 1993 (William M. Johnson, David B. Witt, and Murali Chinnakonda, "High Performance Load/Store Functional Unit and Data Cache"), which is incorporated herein by reference in its entirety.

Figure 2:
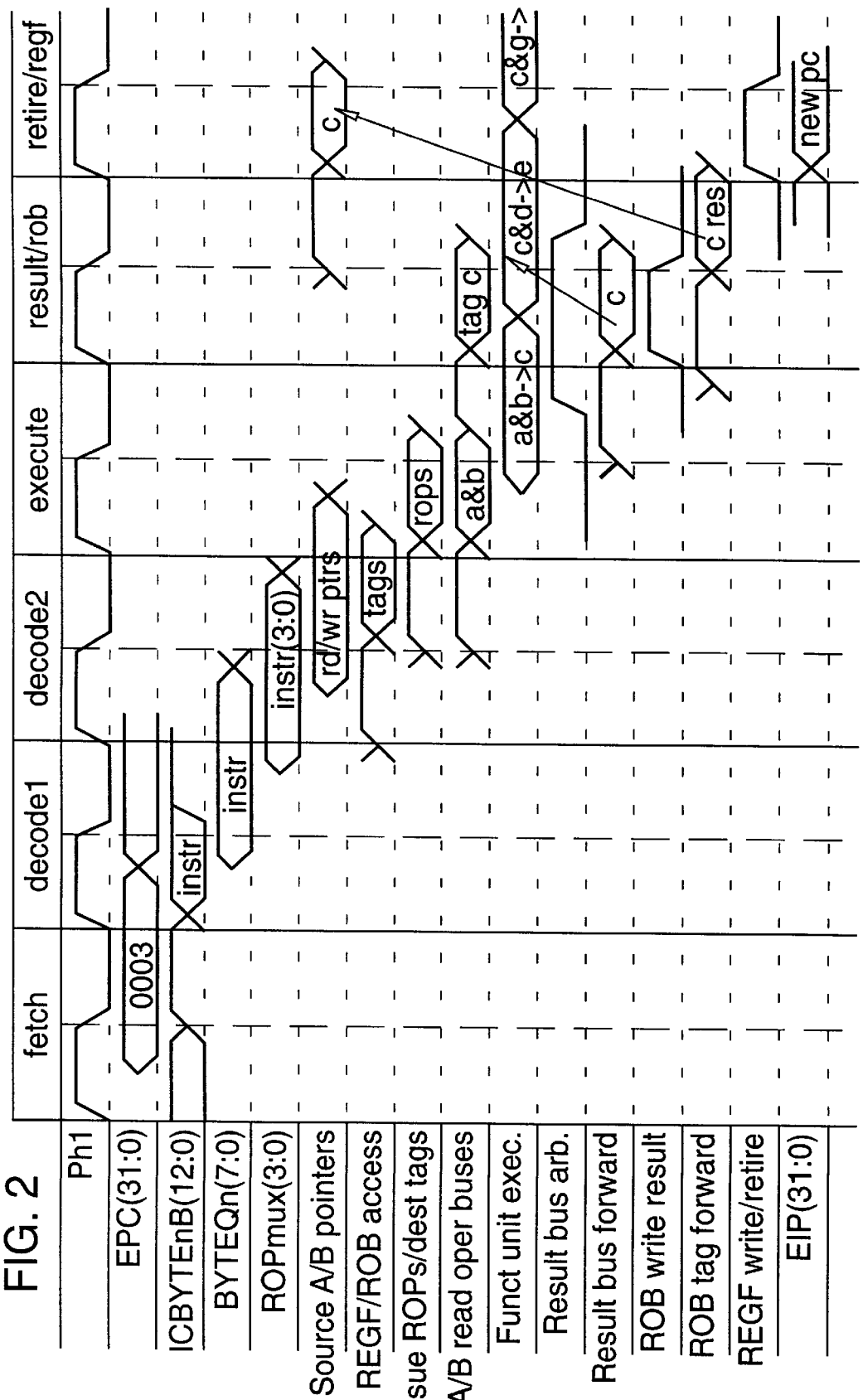
FIG. 2 is a timing diagram for a five effective stage sequential execution pipeline in the processor of FIG. 1.

The processor 100 of FIG. 1 operates in effect as a five stage pipeline. A timing diagram for a sequential execution pipeline is shown in FIG. 2. The first pipeline stage is a fetch stage, in which the value of a fetch program counter FPC [31:0] is determined and compared with tags of the ICACHE 104 to determine a cache hit or miss. The next two pipeline stages are decode stages DECODE1 and DECODE2. Multiple instructions ICBYTEnB[12:0], which are the next to be speculatively decoded instructions, are fetched in accordance with FPC and forwarded to the BYTEQ 106 in phase one of the DECODE1 stage. Entries BYTEQn[7:0] of the BYTEQ 106 are decoded to various ROP fields ROPMUXP [3:0], which become valid in phase two of the DECODE1 stage. The various outputs of the IDECODE 108 become valid in phases one and two of the DECODE2 stage. For example, the A & B operand pointers for the four ROPs become valid in phase one of the DECODE2 stage, thereby allowing the A and B operands from the REGF 112 and the ROB 114 or their tags from the ROB 114 to be accessed in phase two of the DECODE2 stage. In the subsequent execute, result, and retire stages, the A and B source operands and tags become valid and are furnished to the functional unit reservation stations 121–122 and 124–126, the fInctional units 131–136 execute the ROPs and arbitrate for the result bus 140, results are written to the reservation stations 121–122 and 124–126 and to the ROB 114, and operands are retired from the ROB 114 to the REGF 112.

Figure 3:
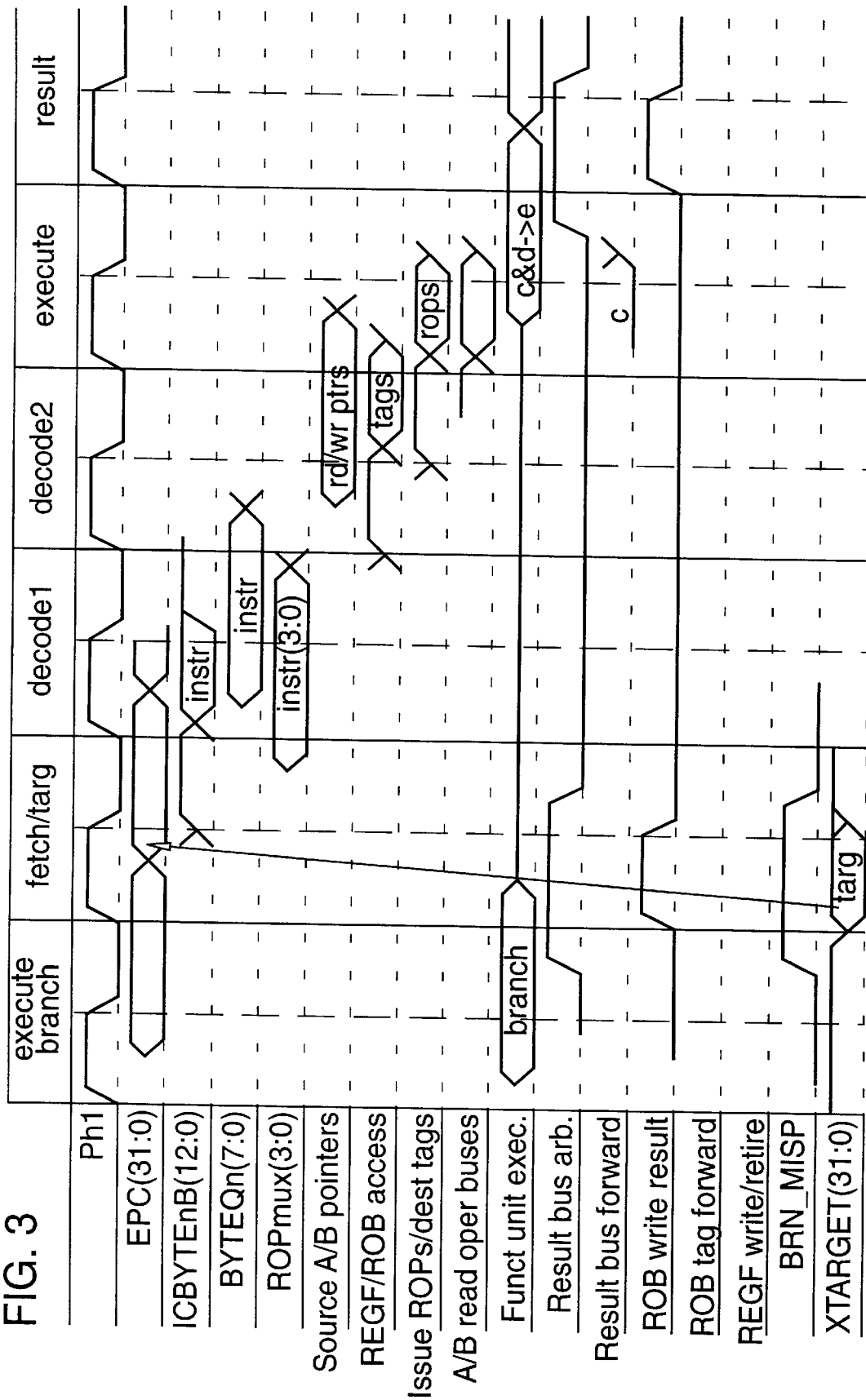
FIG. 3 is a timing diagram for a five effective stage execution pipeline having a misprediction penalty, in the processor of FIG. 1.

A timing diagram for a sequential execution pipeline having a mispredicted branch is shown in FIG. 3. This misprediction penalty from execution of the branch to the execute store of the corrected path is three clock cycles. A branch compare is done during the execution of the branching instruction. If a branch misprediction is detected, a fetch stage is entered into. The branch target address XTARGET [31:0] becomes valid in phase one of FETCH and is driven onto a bus as FPC, and multiple instructions ICBYTEnB [12:0] are fetched in accordance with FPC. The next two pipeline stages are the decode stages DECODE1 and DECODE2, which proceed essentially as described for the sequential execution pipeline shown in FIG. 2.

Byte Queue Characteristics

The BYTEQ 106 functions as an interface between the ICACHE 104 and the IDECODE 108. Conceptually, the byte queue BYTEQ 106 is a queue of up to sixteen entries representing zero, one or more pre-decoded x86 instructions. Each pre-decoded x86 instruction starts on an instruction start and ends on an instruction end, and consists of one or more elements. Each element includes a valid bit, an x86 instruction byte, pre-decode information of the predicted executed state, and branch misprediction information.

A general representation of a pre-decoded x86 instruction resulting from the processing of an x86 instruction in the ICACHE 104 is shown in FIG. 4. The ICACHE 104 parses and pre-decodes the x86 instructions, and stores the results. As x86 instructions are dispatched from the BYTEQ 106 and subsequent x86 instructions are advanced to the head of the queue, the pre-decoded x86 instructions are copied into locations of the BYTEQ 106 as there is space available. If one or more prefixes are present in the raw x86 instruction, the pre-decoded x86 instruction includes one or more prefix elements. The last prefix element is a consolidated prefix element containing complete prefix information for the IDECODE 108, while the other prefix elements are re-coded prefix elements containing partial information and are not used by the IDECODE 108. FIG. 4 shows re-coded prefix element 402 and consolidated prefix element 404. An OPCODE element 410 containing an x86 instruction opcode byte follows the prefix elements 402 and 404. If the raw x86 instruction performs special memory addressing, the pre-decoded x86 instruction includes a mod r/m element, e.g. mod r/m element 412. If the raw x86 instruction requires certain addressing modes, the pre-decoded x86 instruction includes an sib element; e.g. sib element 414. If the raw x86 instruction requires displacement information for address computation or contains immediate data, the pre-decoded x86 instruction includes a displacement/immediate data element; e.g. displacement/immediate data element 416.

FIG. 4 also shows an example of how pre-decode information is asserted. All elements in the illustrated pre-decoded x86 instruction are valid, as indicated by an asserted "v" bit. The first element of the pre-decoded x86 instruction of FIG. 4, the re-coded prefix 402, is identified by an asserted "s" bit. The rop bits, which indicate the number of ROPs required for the x86 instruction, are not shown asserted because the re-coding operations may not yield valid rop information. The next element of the pre-decoded x86 instruction of FIG. 4 is the consolidated prefix 404, which is accompanied by valid rop bits (all subsequent elements of the pre-decoded x86 instruction contain valid rop bits). The x86 instruction opcode element 410 which follows is identified by an asserted "op" bit. The displacement-immediate element 416 is marked as the last element of the pre-decoded x86 instruction by an asserted "e" bit.

Note that if the raw x86 instruction contains a two byte opcode, the first byte is handled by the ICACHE 104 like a prefix byte so that the consolidated prefix of the pre-decoded x86 instruction immediately precedes an opcode element containing the second opcode byte of the raw x86 instruction. In this event, the re-coded prefix immediately preceding the consolidated prefix does contain valid rop bits.

A representative element of the BYTEQ 106 is shown in detail in FIG. 5. Bit BYTEQV[x] indicates whether the element is valid. A byte selected from or iiderived from the bytes of the raw x86 instruction is contained in BYTEQx [7:0], and may be re-coded prefix information, consolidate prefix information, opcode information, mod r/m information, sib information, or displacement or immediate data information. Pre-decode information includes BYTEQP2[x], which indicates when logic 1 that the accompanying raw byte is an opcode byte; BYTEQP1 [x] and BYTEQP0[x], which indicate the number of ROPs needed to execute the x86 instruction (see Table 2); BYTEQS[x], which indicates whether the accompanying raw byte is the first byte of the x86 instruction; and BYTEQE[x], which indicates whether the accompanying raw byte is the last byte of the x86 instruction. Branch misprediction information includes BYTEQNS[x], BYTEQCLM0[x] and BYTEQCLM1[x].

TABLE 2

| BYTEQP1 BYTEQP0 | DESCRIPTION |
| --- | --- |
| 00 | One ROP x86 instruction |
| 01 | Two ROP x86 instruction |
| 10 | Three ROP x86 instruction |
| 11 | Micro-ROM entry point |

Figure 6:
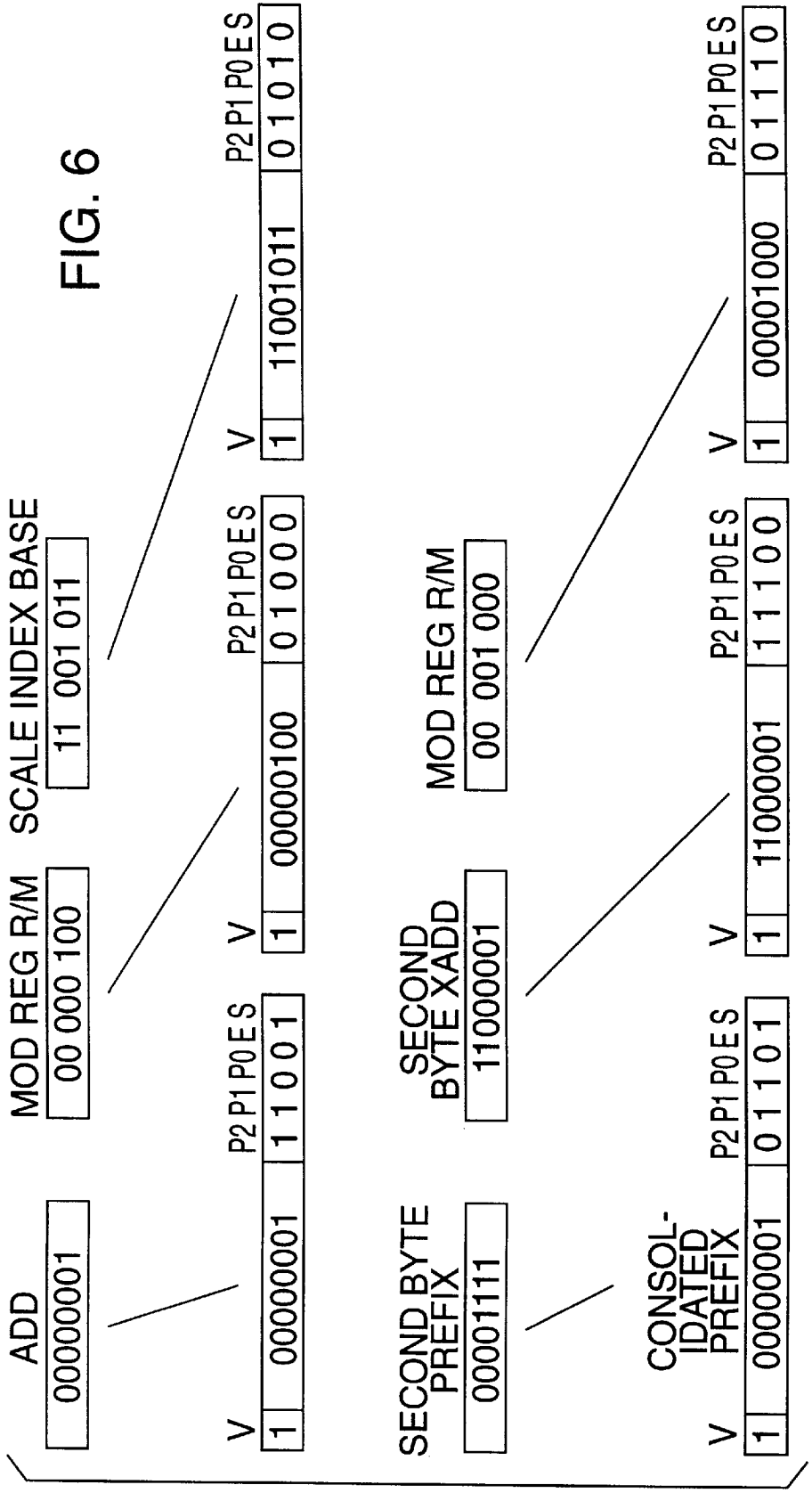
FIG. 6 is a pictorial representation of a conversion of an x86 instruction known as an ADD instruction to a pre-decoded x86 instruction.

FIG. 6 is an example of the parsing of one of the common x86 instruction forms, and how the pre-decoded x86 instruction is stored in locations of the BYTEQ 106. Assume, for example, that the operation desired is a register to memory addition of a quantity in the 32-bit general register EAX to a quantity in the memory location pointed to by EBX+ECX*8, with the sum being placed in the memory location pointed to by EBX+ECX*8. The address mode using EBX+ECX*8 is one of the complicated x86 address modes. The instruction is represented in x86 assembly language by the single instruction:

ADD [EBX+ECX*8], EAX

One embodiment of a three operand RISC architecture would require the following sequence of three ROPs to perform an arithmetic operation equivalent to the x86 ADD instruction.

LOAD TEMP, [EBX+ECX*8]

ADD TEMP, TEMP, EAX

STORE [EBX+ECX*8], TEMP

The LOAD ROP writes the quantity stored in memory at the address determined by the quantity in EBX added to the quantity in ECX times 8 into a temporary register TEMP. The ADD ROP adds the quantity in register TEMP and the quantity in register EAX, and stores the result in register TEMP. The STORE ROP stores the quantity in register TEMP into memory at the address determined by the quantity in EBX added to the quantity in ECX times 8.

As shown in FIG. 6, the ADD register to memory instruction is contained in three raw bytes: an ADD opcode byte, a mod r/m byte, and an sib byte. The ICACHE 104 generates appropriate pre-decode information, allocates three locations of the BYTEQ 106 to the x86 instruction, and writes the pre-decode information and the x86 instruction bytes (branch mispredict information omitted for clarity) to the respective locations of the BYTEQ 106. All locations are indicated as valid. No prefix byte is present. The pre-decode information for the opeode byte is 11001, indicating that the byte queue entry at the first location is an opcode of an x86 instruction requiring a sequence of three ROPs to execute, is not the last byte of the pre-decoded x86 instruction, and is the start byte of the pre-decoded x86 instruction. The pre-decode information for the mod r/m byte is 01000, indicating that the element is not an opcode, is part of an x86 instruction requiring a sequence of three ROPs to execute, is not the last byte of the pre-decoded x86 instruction, and is not the start byte of the allocated x86 instruction. The pre-decode information for the sib byte is 01010, indicating that the element is not an opcode, is part of an x86 instruction requiring a sequence of three ROPs to execute, is the last byte of the pre-decoded x86 instruction, and is not the start byte of the pre-decoded x86 instruction.

FIG. 6 also contains an example of the parsing of an x86 instruction form which maps to more than three ROPs, and how the pre-decoded x86 instruction is stored in locations of the BYTEQ 106. Assume, for example, that the operation desired is to load the quantity in memory pointed to by the EAX register into the ECX register, and then to load the sum of the quantity in memory pointed to by the EAX register and the original quantity in the ECX register into the EAX register. The instruction is represented in x86 assembly language by the single instruction:

XADD [EAX], ECX

One embodiment of a three operand RISC architecture would require the following sequence of four ROPs to perform an arithmetic operation equivalent to the x86 XADD instruction.

LOAD TEMP1, [EAX]

ADD TEMP0, TEMP1, ECX

STORE [EAX], TEMP0

OR ECX, TEMP1,0

The LOAD ROP writes the quantity stored in memory using the address specified by the EAX register into a temporary register TEMP1. The ADD ROP adds the quantity in the TEMP1 register and the quantity in the ECX register, and stores the result in another temporary register TEMP0. The STORE ROP stores the sum in the temporary register TEMP0 in memory using the address specified by the EAX register. The OR instruction moves the quantity in the temporary register TEMP1 to the register ECX by performing a logical inclusive OR operation of the quantities in TEMP1 with zero, and placing the result in the ECX register.

As shown in FIG. 6, the XADD instruction is contained in three raw bytes: a second byte prefix byte, the second byte XADD opcode byte, and a mod r/m byte. The ICACHE 104 generates appropriate pre-decode information, allocates three locations of the BYTEQ 106 to the x86 instruction, and writes the pre-decode information and the x86 instruction bytes (branch mispredict information omitted for clarity) to the respective locations of the BYTEQ 106. All locations are indicated as valid. Note that the raw second byte prefix byte 00001111 is coded by the ICACHE 104 and stored in the BYTEQ 106 as the consolidated prefix 00000001. The pre-decode information for the consolidated prefix byte is 01101, indicating that the byte queue entry at the first location is not an opcode. The pre-decode information for the second byte of the XADD instruction is 11100, indicating that the byte queue entry at the second location is an opcode of an x86 instruction requiring a sequence of more than three ROPs to execute, is not the last byte of the pre-decoded x86 instruction, and is not the start byte of the pre-decoded x86 instruction. The pre-decode information for the mod r/m byte is 01110, indicating that the element is not an opcode and is the last byte of the pre-decoded x86 instruction.

IDECODE Overview

Figure 7:
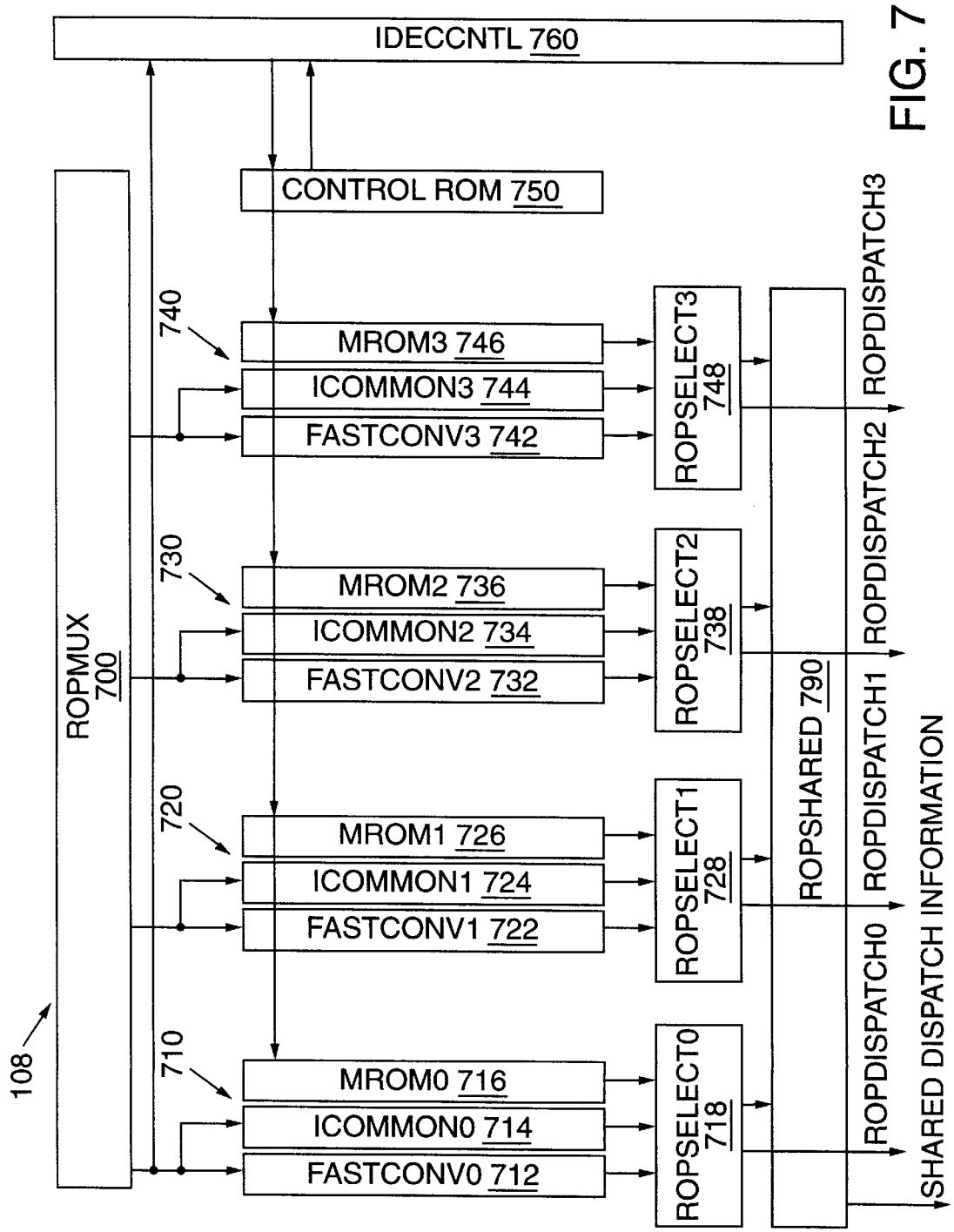
FIG. 7 is an architecture-level block diagram of an instruction decoder.

The IDECODE 108 is a two-stage pipelined decoder which receives pre-decoded x86 instruction bytes from the BYTEQ 106, translates them into respective sequences of ROPs, and rapidly dispatches ROPs from a plurality of dispatch positions. To maximize the opportunity for multiple instruction issue, the translation is handled in a hardwired fast conversion path for most simple instructions which, in the embodiment of FIG. 7, are x86 instructions which map to three ROPs or less. Instructions which require more than three ROPs and infrequently used instructions are handled by microcode sequences contained in microcode ROM. Whether an x86 instruction is handled in the fast conversion path or microcode ROM, the pre-decoded x86 instruction information is duplicated at multiple dispatch positions to allow each dispatch position to work independently and in parallel with other dispatch positions.

In the DECODE1 stage, the IDECODE 108 determines whether ROPs for an x86 pre-decoded instruction are to be generated in the fastpath or the microcode ROM path. In the embodiment of FIG. 7, information for ROP sequences either is generated by fastpath logic for up to four x86 instructions per cycle using up to four ROPs, or is read from microcode ROM for one pre-decoded x86 instruction. The information from the fastpath and the microcode ROM path which is required to generate an ROP includes the type of functional unit to which the ROP is designated to go, the specific simple RISC-like instruction to be executed at the functional unit, source and destination pointers for the ROP, size information of the ROP, addressing mode if a load or a store ROP, and immediate fields if any from the instruction for the ROP. Preferably, microcode ROM accesses are not mixed with fastpath decode, which avoids having to shift microcode ROPs. In the DECODE2 stage, the IDECODE 108 selects and augments the ROP information from either the fastpath or the microcode ROM and furnishes complete ROPs which are executed in the functional units 131–136.

The IDECODE 108 also controls shifting of the BYTEQ 106, so that fully dispatched pre-decoded x86 instructions are shifted out of the BYTEQ 106 and the next undispatched or partially dispatched pre-decoded x86 instruction is shifted to the "head of queue."

The IDECODE 108 also detects problems in the BYTEQ 106 and indirectly redirects the ICACHE 104 as appropriate by forcing a microcode entrypoint. The IDECODE 108 also accepts microcode ROM entry points initiated by cache refill logic in the ICACHE 104, and by exception and micro-branch misprediction logic in the BRNSEC 135. Microcode entry points generated by the BRNSEC 135 are communicated to the IDECODE 108 over the XTARGET bus 103.

Figure 8:
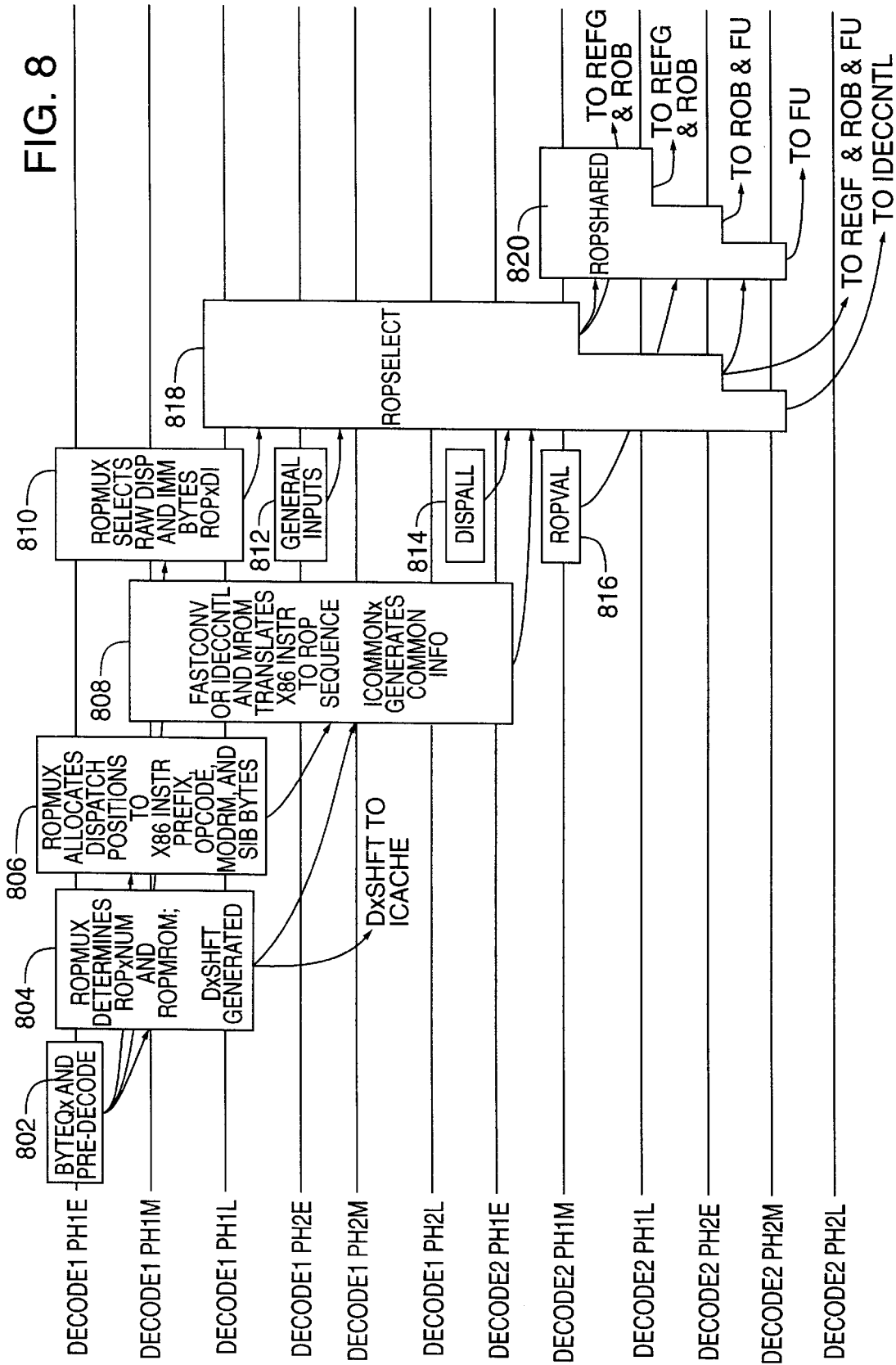
FIG. 8 is a timing diagrams for major events involving the fast conversion paths and the memory ROM paths of the instruction decoder of FIG. 7.

The architecture of the IDECODE 108 is shown in FIG. 7, and a timing diagram for major events in the IDECODE 108 is shown in FIG. 8. An ROP multiplexer ROPMUX 700 directs entries of the BYTEQ 106 to four dispatch positions 710, 720, 730 AND 740, which include respective fast converters FASTCONV0 712, FASTCONV1 722, FASTCONV2 732, and FASTCONV3 742; respective common stages ICOMMON0 714, ICOMMON1 724, ICOMMON2 734, and ICOMMON3 744; and respective microcode ROMs MROM0 716, MROM1 726, MROM2 736, and MROM3 746. MROM0 716, MROM1 726, MROM2 736, and MROM3 746 are controlled by microcode ROM controller IDECCNTL 760. These elements generally form the first stage of the IDECODE 108. The second stage of the IDECODE 108 generally is implemented in ROPSELECT0 718, ROPSELECT1 728, ROPSELECT2 738, and ROPSELECT3 748, and in ROPSHARED 790.

The IDECODE 108 is controlled by IDECCNTL 760. The IDECCNTL 760 contains logic implementation in combinatorial logic or programmable array logic for providing general control functions such as funishing instruction type information on the TAD bus 118, predicting how many of the ROPs in the current dispatch window can be accepted by the RISC core 110, informing the ICACHE 104 how to shift the BYTEQ 106 in view of the prediction, informing the ROPMUX 700 of the number of ROPs yet to be dispatched for the pre-decoded x86 instruction at the head of the BYTEQ 106, and accessing microcode and control ROM. To provide these functions, the IDECCNTL 760 receives various information from the functional units 131–136 of the RISC core 110 as well as from other units of the processor 100.

FASTCONVx 902 (FIG. 9 and FIG. 15) is representative of each of the fast converters FASTCONV0 712, FASTCONV1 722, FASTCONV2 732, and FASTCONV3 742. FASTCONVx 902 performs a fast conversion of many types of "simple" x86 instructions (i.e. those which map to 3 or fewer ROPs) into ROPs. The FASTCONVx 902 in each dispatch position converts the x86 instruction to a respective one of a sequence of ROPs (a sequence being one or more ROPs) needed to carry out the x86 instruction, and modifies the operation of the ROP for certain prefixes and SIB bytes. FASTCONVx 902 is implemented either as programmable array logic or as combinatorial logic latched early in phase one of the DECODE2 stage.

Rarely used x86 instructions and x86 instructions requiring ROP sequences of more than 3 ROPs to execute are mapped to microcode ROM. Generally, the x86 instructions which map to more than three ROPs are the complex interactive instructions such as the CALL gate instruction, the STRING move instruction, and the transcendental floating point routines. In that event, control logic in the IDECODE 108 forms a microcode ROM address known as an entrypoint, and based on the entrypoint, reads the ROP sequence from the microcode ROM instructions stored in the MROM0 716, MROM1 726, MROM2 736, and MROM3 746 at four ROPs per cycle. MROMx 906 (FIG. 9 and FIG. 15) is representative of each of the microcode ROMs MROM0 716, MROM1 726, MROM2 736, and MROM3 746. MROMx 906 is a 1024×59 ROM array for handling x86 instructions which are not convertible in FASTCONVx 902.

The dispatch positions 710, 720, 730 and 740 also include respective pipeline stages ICOMMON0 714, ICOMMON1 724, ICOMMON2 734, and ICOMMON3 744. ICOMMONx 904 (FIG. 9 and FIG. 15) is representative of each of the pipeline stages ICOMMON0 714, ICOMMON1 724, ICOMMON2 734, and ICOMMON3 744. The ICOMMONx 904 is associated with the FASTCONVx 902 and MROMx 906 of the dispatch position x (x=0,1,2,3). Portions of x86 instruction conversion operations which can be effectively handled in a particular way regardless of whether the instruction is a fastpath or microcode ROM instruction, and which do not require generation in the MROMx 906, are carried out and pipelined, along with common data not requiring conversion, through ICOMMONx 904 in step with the processing of instruction portions in the various stages of FASTCONVx 902 or MROMX 906. ICOMMONx 904 also keeps track of register pointers which are used for performing address calculations used both by fastpath instructions and MROM instructions. Advantageously, the FASTCONVx 902 design and the MROMx 906 design are simplified. ICOMMONx 904 is implemented as combinatorial logic or programmable array logic latched in early phase one of the DECODE2 stage. All x86 instructions use this logic.

Selector circuit ROPSELECTx 1500 (FIG. 15) is representative of each of the ROPSELECT0 718, ROPSELECT1 728, ROPSELECT2 738, and ROPSELECT3 748. ROPSELECTx 1500 selects either the outputs of the FASTCONVx 902 and the ICOMMONx 904, or the outputs of the MROMx 906 and the ICOMMONx 904, and generates dispatch information. ROPSELECTx 1500 also selects the immediate field constant values to drive immediate address or constants to the functional units 131–136. Another unit, ROPSHARED 790, is responsive to information from the ROPSELECTx 1500 in each of the dispatch positions 710, 720, 730 and 740 for generating dispatch information for resources that are shared by all dispatch positions.

The IDECCNTL 760 is any suitable state machine for controlling the operation of the various units of the IDECODE 108.

The function of the IDECODE 108 of FIG. 7 for frequently used x86 instructions which map to three or fewer ROPs is illustrated by how the ADD instruction of FIG. 6 is processed. The ROPMUX 700 drives the ADD instruction to the first three dispatch positions 710, 720 and 730. The ADD instruction is processed in the FASTCONVx 902 and ICOMMONx 904 units of the dispatch positions 710, 720 and 730. Hence, FASTCONV0 712 and ICOMMON0 714 provide initial logic operations to convert the ADD instruction into the first ROP LOAD TEMP←[EBX+ECX*8]. In a similar manner, FASTCONV1 722 and ICOMMON1 724 provide initial logic operations to convert the ADD instruction into the second ROP ADD TEMP, TEMP, EAX; and FASTCONV2 732 and ICOMMON2 734 provide initial logic operations to convert the ADD instruction into the third ROP STORE [EBX+ECX*8]←TEMP.

The function of the IDECODE 108 of FIG. 7 for infrequently used x86 instructions and for x86 instructions which map to a sequence of four or more ROPs is illustrated by how the XADD instruction of FIG. 6 is processed. The XADD instruction, which is positioned at the head of the BYTEQ 106, is driven by the ROPMUX 700 to all four dispatch positions 710, 720, 730 and 740, and is processed in the ICOMMONx 904 units of the dispatch positions 710, 720, 730 and 740. The XADD instruction is also supplied to the IDECNTL760, which determines an entrypoint value for accessing the MROM0 716, MROM1 726, MROM2 736 and MROM3 746, and for accessing the control ROM 750. Based on the entrypoint, ROP information for the first ROP in the sequence is read out of the MROM0 716 and combined with the output of ICOMMON0 714 to furnish the first ROP LOAD TEMP1, [EAX]. In a similar manner, ROP information for the second ROP in the sequence is read out of the MROM1 726 in accordance with the value of the entrypoint and combined with the output of ICOMMON0 724 to fsh the second ROP ADD TEMP0, TEMP1, ECX; ROP information for the third ROP in the sequence is read out of the MROM2 736 in accordance with the value of the entrypoint and combined with the output of ICOMMON0 734 to furnish the third ROP STORE [EAX], TEMP0; and ROP information for the fourth ROP in the sequence is read out of the MROM3 746 in accordance with the value of the entrypoint and combined with the output of ICOMMON0 744 to furnish the fourth ROP OR ECX, TEMP1. In the event that the x86 instruction were to map to more than the number of dispatch positions available for processing it (the XADD instruction, which maps to four ROPs, does not), processing would continue in the next cycle with the fifth ROP being dispatched from dispatch position 0.

The ROP Multiplexer ROPMUX

Figure 9:
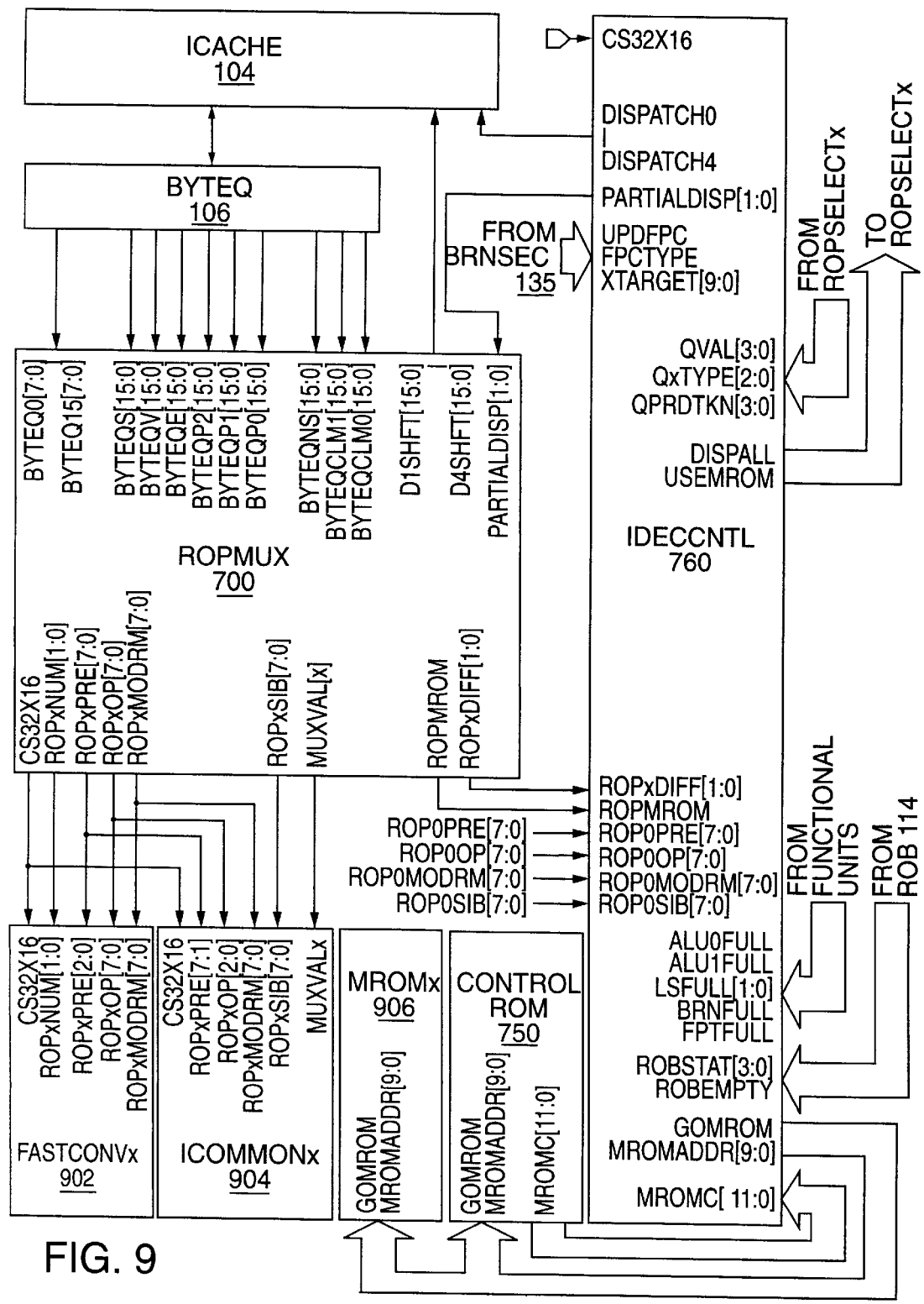
FIG. 9 is a data-address-control signal level block diagram showing interconnections between the ROP multiplexer of the instruction decoder of FIG. 7 and various other functional blocks of the processor of FIG. 1.

The ROPMUX 700, which is shown in FIG. 9 with connections to other elements of the IDECODE 108 and various flnctional blocks in the architecture of the processor 100 shown in FIG. 1, is responsible for allocating a complete pre-decoded x86 instruction in the BYTEQ 106 to one or more of the dispatch positions 710, 720, 730 and 740 in the IDECODE 108. One or more pre-decoded x86 instructions are directed concurrently from the BYTEQ 106 to available ones of the dispatch positions 710, 720, 730 and 740, beginning with the x86 instruction at the head of the BYTEQ 106. For example, if each of the first four pre-decoded x86 instructions in the BYTEQ 106 maps to one ROP, the first pre-decoded x86 instruction at the head of the BYTEQ 106 is muxed to dispatch position 0, the second pre-decoded x86 instruction is muxed to dispatch position 1, the third pre-decoded x86 instruction is muxed to dispatch position 2, and the fourth pre-decoded x86 instruction is muxed to dispatch position 3. Alternatively, if the second pre-decoded x86 instruction in the BYTEQ 106 maps to two ROPs, the first pre-decoded x86 instruction is muxed to dispatch position 0, the second pre-decoded x86 instruction is muxed to dispatch positions 1 and 2, and the third pre-decoded x86 instruction is muxed to dispatch position 3.

A pre-decoded x86 instruction which does not map to microcode ROM and does not entirely fit in the dispatch window is allocated as many dispatch positions 710, 720, 730 and 740 as available in the first dispatch window. The IDECCNTL 760 uses a signal PARTIALDISP[1:0] to determine whether some of the ROPs of the x86 instruction at the front of the dispatch window have been dispatched, so that the already dispatched ROPs are not allocated dispatch positions.

The byte queue entries of a pre-decoded x86 instruction which maps to microcode ROM and which resides at the head of queue of the BYTEQ 106 are directed to all four dispatch positions 710, 720, 730 and 740.

Figure 10A:
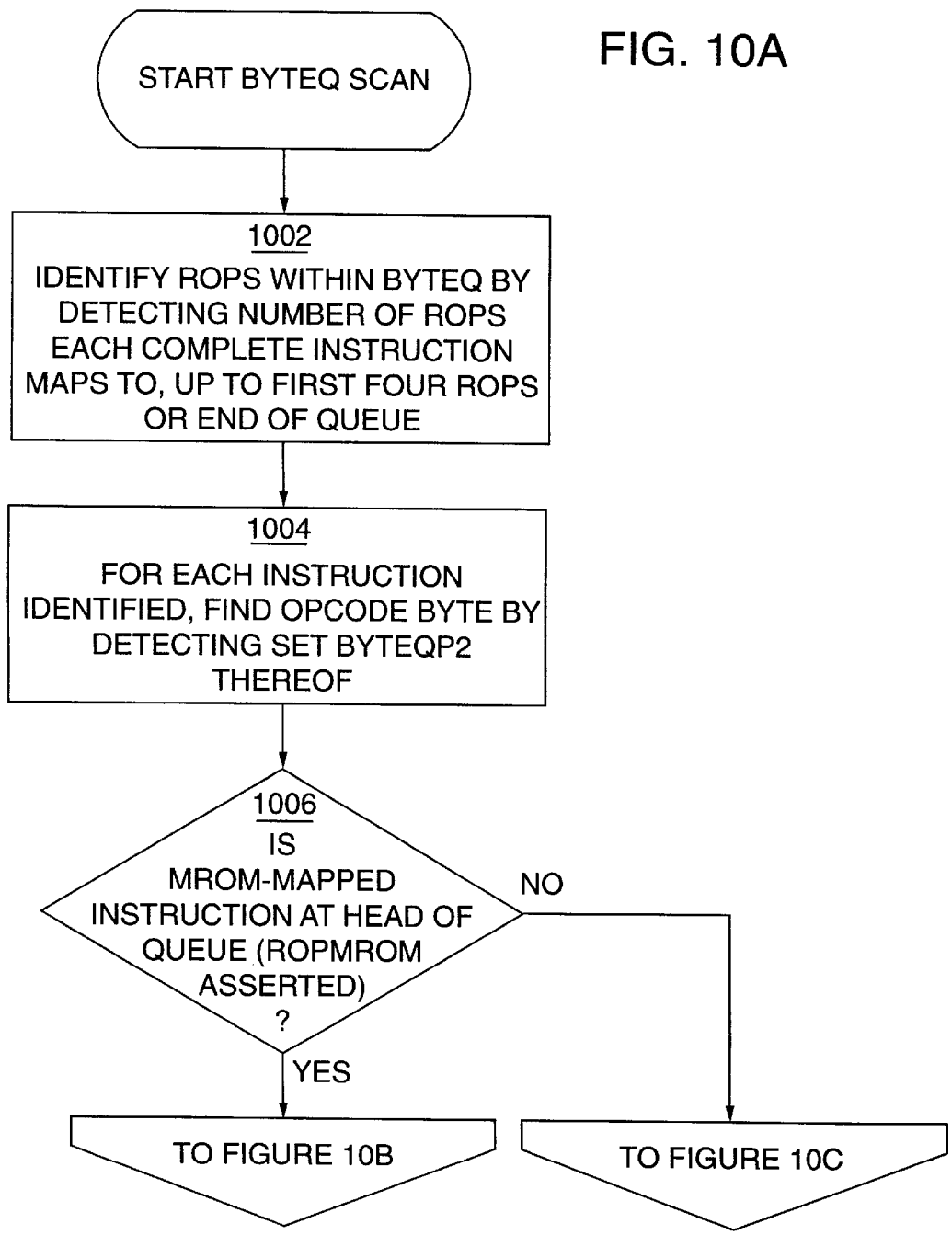
FIGS. 10A, 10B, and 10C are flowcharts showing a method implemented by the ROP multiplexer of FIG. 9.
Figure 10B:
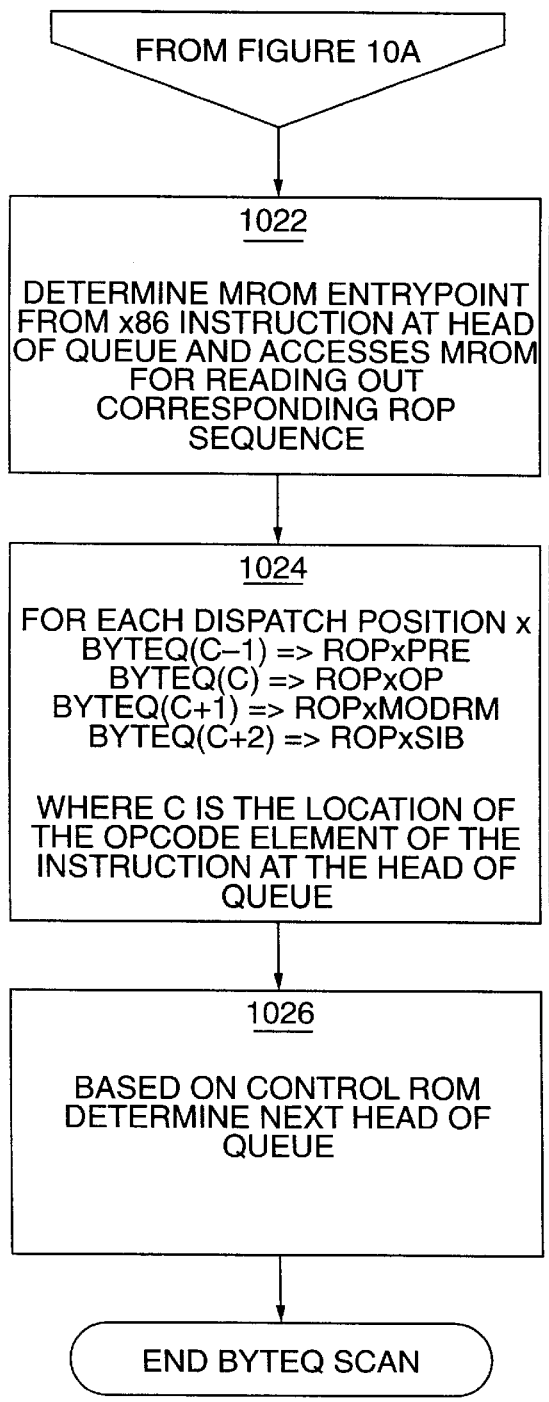
Figure 10C:
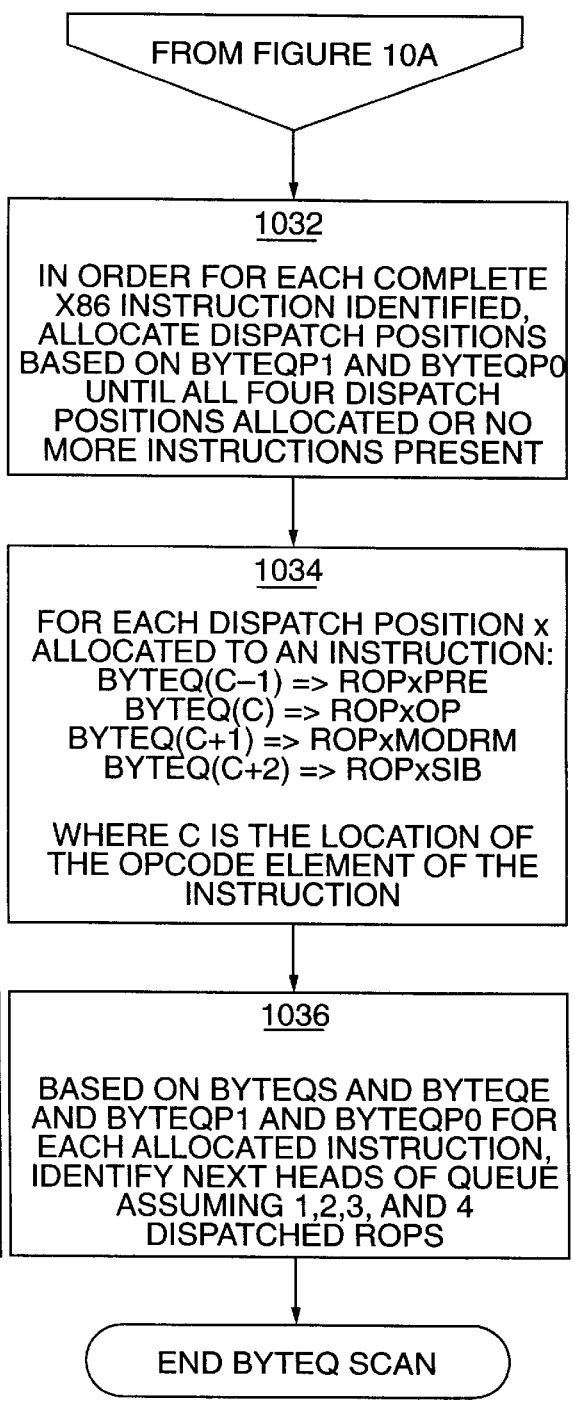
Figure 11:
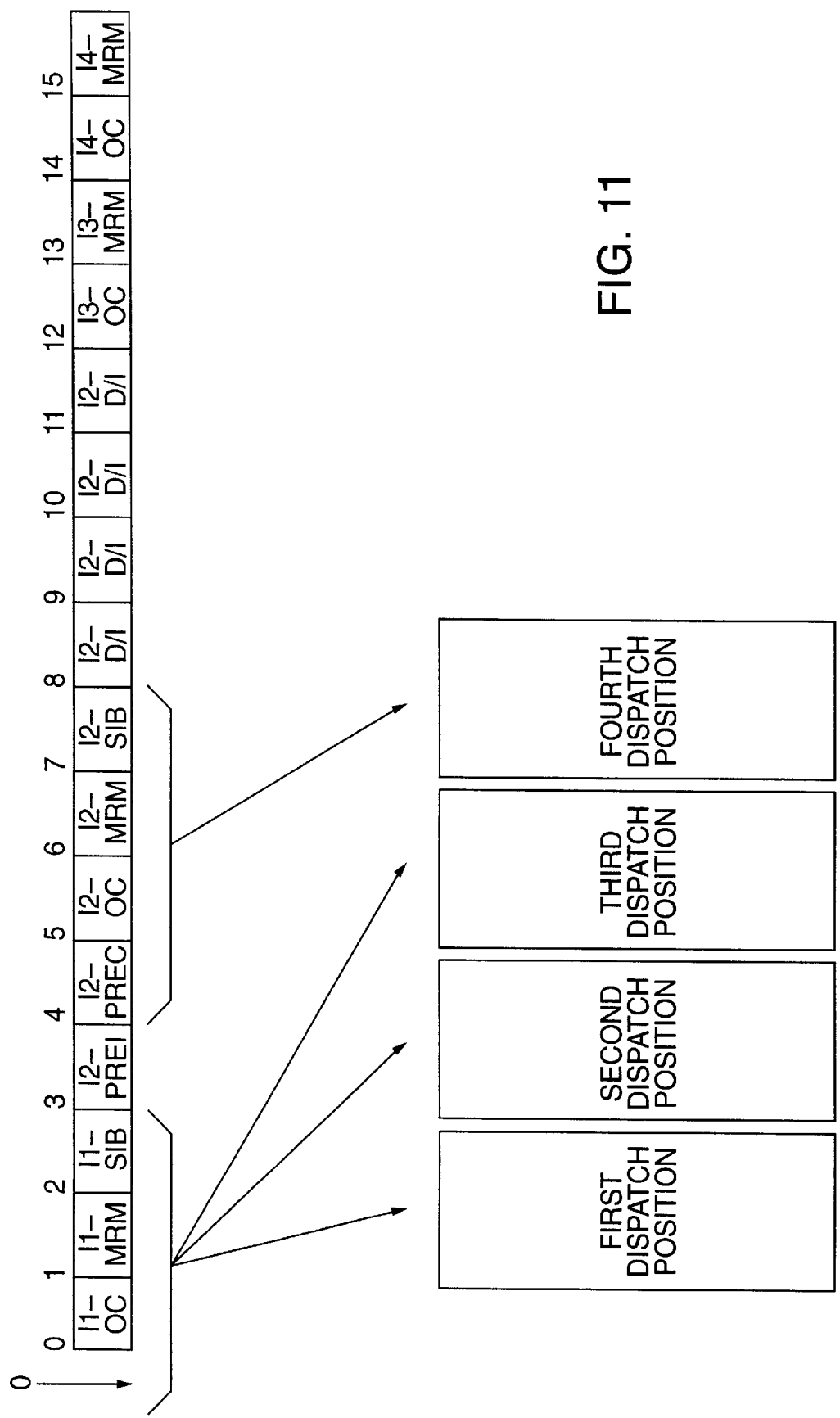
FIGS. 11 and 12 are pictorial representations of the dispatch of pre-decoded x86 instructions by the ROP multiplexer of FIG. 9.
Figure 12:
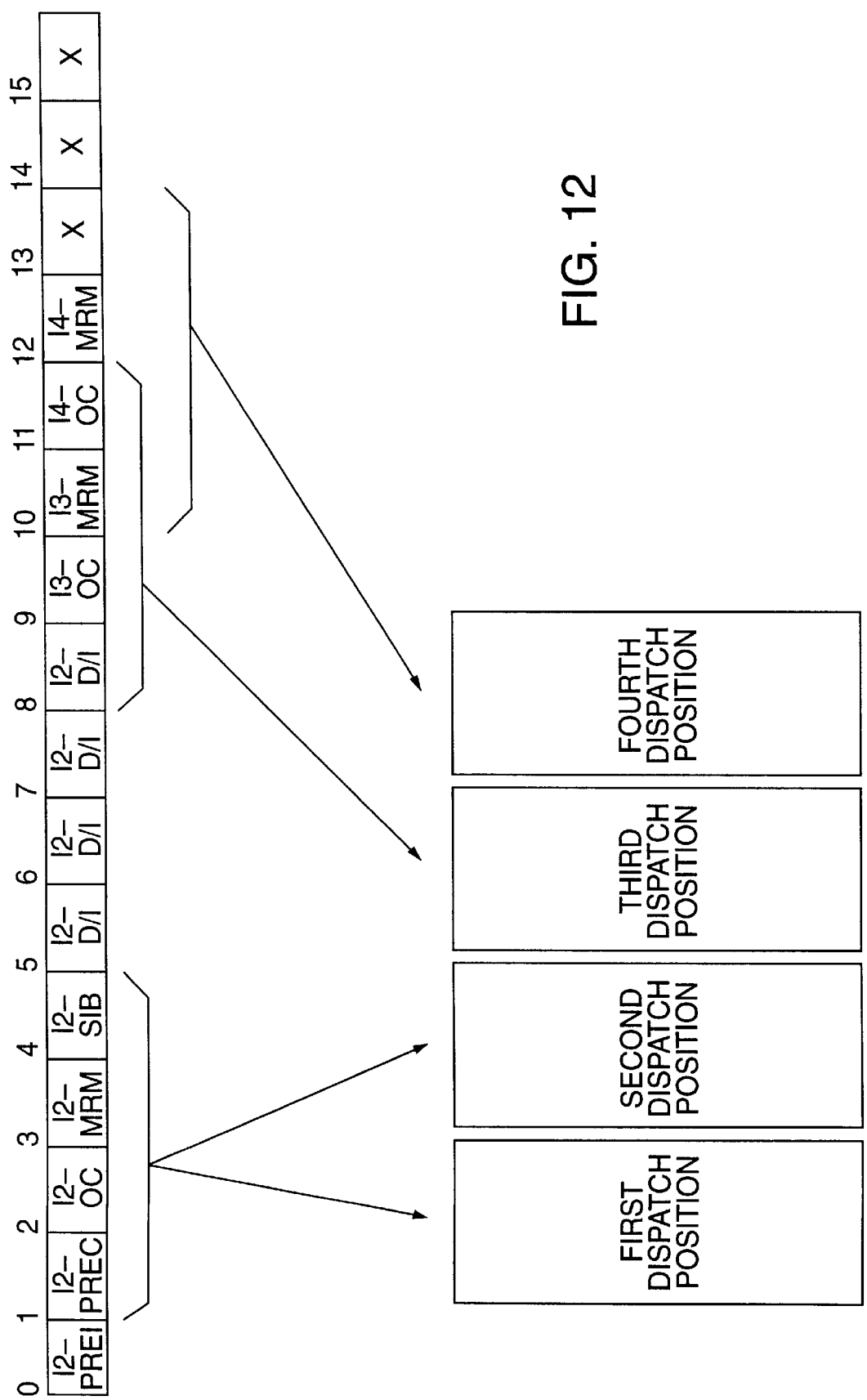

The operation of the ROPMUX 700 is shown in FIG. 10, which is a flowchart of a scanning function for the BYTEQ 106; and in FIG. 11 and FIG. 12, which depict how elements of specific tppes of pre-decoded x86 instructions in the BYTEQ 106 are directed to dispatch positions in the IDE-CODE 108 by the ROPMUX 700. When the BYTEQ 106 becomes valid after a shifting operation, the ROPMUX 700 "scans" the BYTEQ 106 to identify and to obtain certain information about complete pre-decoded x86 instructions and the number of ROPs to which they map. To avoid unnecessary delay, the scanning preferably is performed essentially concurrently using either combinatorial logic or programmable array logic. The flowchart of FIG. 10 is furnished to illustrate the various operations performed by the byte queue scan logic, and is not to be interpreted as necessarily suggesting a sequential ordering of those various operations.

In operation 1002, the byte queue scan finction identifies the instructions in the BYTEQ 106, beginning at the head of queue, which collectively map to four ROPs. If the end of queue is encountered before four ROPs are detected, the byte queue scan function identifies all instructions in the BYTEQ 106. The instructions are identified by detecting their respective start bits in the array BYTEQS, and the number of ROPs associated with each instruction is determined by identifyig its opcode byte and detecting the value of ROP bits associated with the opcode byte. Complete instructions are identified by determining that the start bit of the instruction has an opposing end bit in the array BYTEQE.

For example, consider the scan function as applied to the queue entries shown in FIG. 11. Bit BYTEQS[0] identifies the start of the first instruction I1, the opcode byte I1-OC for instruction I1 is identified by bit BYTEQP2[0], and the number of ROPs, hence the number of dispatch positions required to be allocated to instruction I1, is indicated by opcode bits BYTEQP1[0] and BYTEQP0[0]. In a similar manner, the start of the second instruction I2 is identified by the bit BYTEQS[3], its opcode byte is identified by bit BYTEQP2[5], and the number of ROPs to which instruction I2 maps is identified by bits BYTEQP1[5] and BYTEQP0[5]. Instructions I1 and I2 are complete instructions, since set bit BYTEQS[0] has an opposing set bit BYTEQE[2], and set bit BYTEQS[3] has an opposing set bit BYTEQE[11].

In operation 1004, the ROPMUX 700 generates control signals ROPxNUM[1:0] for indicating for the ROPs in the dispatch positions their respective position in the sequence of ROPs for a given instruction (event 804 in FIG. 8). For the example of FIG. 11, ROPONUM is 0, ROPINUM is 1, ROP2NUM is 2, and ROP3NUM is 0.

In operation 1006, a determination is made of whether the pre-decoded x86 instruction at the head of the BYTEQ 106 is a microcode ROM mapped instruction. The operations of FIG. 10B are performed if the predecoded x86 instruction at the head of the BYTEQ 106 is a microcode ROM mapped instruction. The operations of FIG. 10C are performed if the pre-decoded x86 instruction at the head of the BYTEQ 106 is not a microcode ROM mapped instruction.

When the pre-decoded x86 instruction at the head of the BYTEQ 106 is not a microcode ROM mapped instruction, dispatch positions 710, 720, 730 and 740 are allocated in operation 1032 (FIG. 10C) to pre-decoded x86 instructions depending on the number of ROPs to which each pre-decoded x86 instruction maps and the number of dispatch positions available (event 806 of FIG. 8). ROPXNUM for the dispatch positions allocated in this manner are assigned their respective values, control signal ROPMROM is not asserted, and MUXVAL[x] for each dispatch position is asserted. For example, assume that the value of BYTEQP1 [0] and BYTEQP0[0] for instruction I1 is 10, indicating that instruction I1 maps to three ROPs. The first three dispatch positions 0, 1 and 2 are available and are allocated to instruction 1, as shown in FIG. 11. For instruction I2, assume that the value of BYTEQP1[5] and BYTEQP0[5] are also 10, indicating that the instruction I2 maps to three ROPs. Since only one dispatch position is available, it is allocated to instruction I2. Note that dispatch position resources are not available in the present decode stage for full allocation to the instruction I2. The remaining two required dispatch positions are allocated to instruction I2 in the next cycle, after instruction I2 is shifted to the head of the BYTEQ 106 and in accordance with control signal PARTIALDISP, which is set to the value two. If any of the x86 instructions pending for the current dispatch window and not at the head of the BYTEQ 106 maps to microcode ROM, dispatch positions are still allocated. However, ROPxNUM for dispatch positions allocated in this manner is "don't care," since control signal ROPMROM is not asserted and ROPs dispatched from dispatch positions allocated to x86 instructions which map to microcode ROM but which are not at the head of queue are not marked valid (MUXVAL[x] for dispatch position x is not asserted). Invalid ROPs are not processed in subsequent pipeline stages of the processor 100.

In operation 1034, each dispatch position receives four elements from a pre-decoded x86 instruction stored in the BYTEQ 106. The four elements are a consolidated prefix data element, an opcode element, a mod rim element, and a sib element. If an element is not present in the pre-decoded x86 instruction, as determined from the start and end bits of the instruction, the information received at the dispatch position corresponding to the absent element is treated as "don't care" information. For example, a consolidated prefix element is not present in instruction I1 of FIG. 11.

In the example of FIG. 11, the instructions to which dispatch positions are allocated are instructions I1 and I2. The first instruction I1 includes byte queue elements I1-OC, I1-MRM and I1-SIB, which are respectively the opcode element, the mod r/m element, and the sib element of, illustratively, the ADD instruction of FIG. 6. ROPMUX 700 drives these three byte queue elements, along with a null element corresponding to an absent consolidated prefix element, to the dispatch positions allocated it, namely the first, second, and third dispatch positions. The second pre-decoded x86 instruction I2 is, illustratively, obtained from an x86 instruction having prefix modifiers, two opcodes, mod r/m data, sib data, and displacement/immediate data. The second instruction I2 begins with two prefix elements, a re-coded prefix element I2-PREI followed by the consolidated prefix element I2-PREC. Following are the opcode element I2-OC (the first opcode of the raw x86 instruction signaling a two opcode instruction is represented by a bit in the consolidated prefix element I2-PREC), the mod rim element I2-MODRM, and the sib element I2-SIB. The four byte queue elements which follow are all displacement/ intermediate bytes of instruction I2. ROPMUX 700 drives I2-PREC, I2-OC, I2-MRM, and I2-SIB to the dispatch position allocated it, namely the fourth dispatch position.

In operation 1036, the next heads of queue are determined for one, two, three and four ROPs dispatched. This information is used for shifting the BYTEQ 106. FIG. 12 shows dispatch of instructions after instruction I2 is shifted to the head of the BYTEQ 106. Since the set of three ROPs to which the instruction I2 maps was only partially dispatched in the decode stage shown in FIG. 11, the first two dispatch positions 0 and 1 are allocated to the remaining ROPs corresponding to instruction I2 in accordance with control signal PARTIALDISP[1:0], which has a value of two (binary 10). Assuming instructions I3 and I4 each map to one ROP, dispatch position 2 is allocated to instruction I3 and dispatch position 3 is allocated to instruction I4.

When the pre-decoded x86 instruction at the head of the BYTEQ 106 is a microcode ROM mapped instruction, all four dispatch positions are allocated to the microcode ROM mapped instruction. For a microcode ROM mapped instruction, the value of BYTEQP1 and BYTEQPO is 11, indicating that the instruction is microcode ROM mapped. If the allocation of four dispatch position resources is not sufficient for completing dispatch of the ROP sequence to which the x86 instruction maps, the four dispatch position resources are again allocated to the microcode mapped instruction in the next cycle. ROPXNUM for dispatch positions allocated in this manner is "don't care" since it is not used, the dispatch positions are marked valid (MUXVAL[3:0] bits are asserted), and control signal ROPMROM is asserted since the microcode mapped x86 instruction is at the head of queue.

In operation 1022, the IDECCNTL 760 forms a microcode ROM entrypoint and accesses an ROP sequence contained in MROM0 716, MROM1 726, MROM2 736, and MROM3 746. Initially, the entrypoint is based on the ROP0PRE, ROP0OP, ROP0MODRM, and ROP0SIB elements at the head of the BYTEQ 106 as well as on processor state information such as mode (real/protected) and priority level information obtained from the pre-decoded x86 instruction, and subsequently on other information from the microcode sequence itself.

In operation 1024, the consolidated prefix data element, the opcode element, the mod r/m element, and the sib element from the microcode mapped x86 instruction at the head of the BYTEQ 106 are furnished as the signals ROPxPRE, ROPxOP, ROPxMODRM, and ROPxSIB elements to all of the dispatch positions for use by ICOMMONx. If an element is not present in the pre-decoded x86 instruction, as determined from the start and end bits of the instruction, the information received at the dispatch position corresponding to the absent element is treated as "don't care" information.

In operation 1026, the next heads of queue are determined for one, two, three and four ROPs dispatched. This information is used for shifting the BYTEQ 106 in the event that the microcode mapped x86 instruction is fully dispatched.

The various data, address, and control signals associated with the ROPMUX 700 become valid at different times in the FETCH, DECODE1, and DECODE2 pipeline stages in order to complete the instruction decode in only two decode stages. During the FETCH stage, certain branching information from the ICACHE 104 to the ROPMUX 700 becomes valid. Branch prediction is use in the processor 100 of FIG. 1 because the technique allows an adequate instruction-fetch rate in the presence of branches and is needed to achieve performance with multiple issue. Branching is disclosed in U.S. patent application Ser. No. 08/146, 382 filed Oct. 29, 1993, which is incorporated herein by reference in its entirely, and which issued as U.S. Pat. No. 5,651,125. Other suitable branching techniques and systems are well known in the art.

As shown in FIG. 8, the sixteen raw bytes BYTEQx[7:0] from the BYTEQ 106 to the ROPMUX 700 become valid in early phase one of the DECODE1 stage. Also in early phase one of the DECODE1 stage, pre-decode information inputs from the BYTEQ 106 to the ROPMUX 700 become valid. These are the pre-decode start byte indication BYTEQS [15:0], the pre-decode valid byte indication BYTEQV [15:0], the pre-decode end byte indication BYTEQE[15:0], the byte pre-decode information BYTEQP2[15:0], BYTEQP1[15:0], and BYTEQP0[15:0]. BYTEQP2 is set if the associated byte is an opcode byte. Also becoming valid in early phase one is the control signal PARTIALDISP[1:0] from the IDECCNTL 760, which indicates the number of ROPs left to be dispatched for the x86 instruction at the head of the BYTEQ 106.

Also in early phase one of the DECODE1 stage, branch information inputs from the BYTEQ 106 to the ROPMUX 700 become valid. These are the byte non-sequential indication BYTEQNS[15:0], the byte cache column indication BYTEQCLM1[15:0] and BYTEQCLM0[15:0]. The use of this information is discussed in U.S. patent application Ser. No. 08/145,905, filed Oct. 29, 1993 (David B. Witt and Michael D. Goddard, "PreDecoded Instruction Cache and Method Therefor Particularly Suitable for Variable Byte-Length Instructions"), which is incorporated herein by reference in its entirety.

A number of signals furnished to the dispatch positions become valid in late phase one of the DECODE1 stage. As shown in FIG. 8, signal ROPxNUM[1:0] is furnished to the FASTCONVx 902 to indicate whether the dispatch position is allocated to the first, second or third ROP in a particular ROP sequence, or is allocated to microcode ROM. Signal ROPMROM to the IDECCNTL 760 becomes valid to indicate whether the x86 instruction at the head of the byte queue is a microcode ROM instruction.

Also in late phase one of the DECODE1 stage, signal ROPxDIFF[1:0] to the IDECCNTL 760 becomes valid to indicate the number of ROPs left in the allocated x86 instruction for each possible dispatch. ROPXDIFF is furnished to the IDECCNTL 760. ROPxDIFF is used by the IDECCNTL 760 to determine PARTIALDISP, which is the number of ROPs remaining to be dispatch for the pre-decoded x86 instruction at the head of queue in the next cycle. PARTIALDISP[1:0] is latched for the next cycle from one of the ROPxDIFF signals, selected on the basis of the number of ROPs predicted to be dispatched from the current dispatch window. For the example of FIG. 11, ROP0DIFF is 2, ROP1DIFF is 1, ROP2DIFF is 0, AND ROP3DIFF is 2. Assuming the IDECCNTL 760 determines that all four ROPs in the dispatch window are to be dispatched, ROP3DIFF is selected and latched as PARTIALDISP. The value of PARTIALDISP for the next cycle shown in FIG. 12 is therefore two.

The following signals, which also become valid late in phase one of the DECODE1 stage, are furnished to various blocks within each of the dispatch positions 710, 720, 730 and 740. Signal MUXVAL[3:0] contains ROP valid bits for the dispatch positions 710, 720, 730 and 740 respectively. The bits of MUXVAL are respectively furnished to the ICOMMONx 904 blocks of the dispatch positions 710, 720, 730 and 740, which generate dispatch control signals based on their values. Signals ROPxPRE[7:0], ROPxOP[7:0], ROPxMODRM[7:0], and ROPxSIB[7:0], which are furnished in whole or in part to FASTCONVx 902, ICOMMONx 904, and IDECCNTL 760 (x=0,1,2,3) are the prefix, opcode, modrm, and sib bytes of the x86 instruction to which the dispatch position x is allocated. Note that if a particular byte does not apply to a particular instruction, it is treated as a don't care. For example, FIG. 11 shows that because instruction I1 does not contain a prefix byte, dispatch positions 0, 1 and 2 receive invalid data in the relative position of the prefix byte. This invalid data may be, for example, the result of resetting all of the bits in the prefix byte position in the absence of a prefix byte, although other implementations are suitable as well. In any event, the ROPMUX 700 identifies the data as invalid because it is outside the range identified by the instruction start and end bits, and ignores it.

None of the bits of ROPxPRE[7:0] are set unless the byte is valid and its end bit is not set (which indicates it is part of the previous instruction). The prefix information is summarized in the consolidated byte just before the opcode, and contains the information listed in Table 3.

TABLE 3

| BITS | VALUE | MEANING |
|---|---|---|
| 7:5 | 000 | no segment prefix |
| | 001 | CS segment override prefix |
| | 010 | DS segment override prefix |
| | 011 | ES segment override prefix |
| | 100 | FS segment override prefix |
| | 101 | GS segment override prefix |
| | 110 | SS segment override prefix |
| | 111 | reserved |
| 4:3 | 00 | no repeat or lock prefix |
| | 01 | LOCK prefix |
| | 10 | REPNE prefix |
| | 11 | REP/REPE prefix |
| 2 | 0 | no operand size prefix |
| | 1 | operand size prefix |
| 1 | 0 | no address size prefix |
| | 1 | address size prefix |
| 0 | 0 | no two byte opcode prefix |
| | 1 | two byte opcode prefix |

The signals D1SHFT[15:0] through D4SHFT[15:0] from the ROPMUX 700 to the ICACHE 104 also become valid in late phase one of the DECODE1 stage, as shown in FIG. 8. These signals indicate to the ICACHE 104 the position of the byte that should be shifted to the front of the byte queue for all possible numbers of ROPs dispatched: 1, 2, 3, or 4 ROPs. Which of the signals is used depends on an estimate determined by the IDECCNTL 760 and communicated to the ICACHE 104 as signals DISPATCH0 through DISPATCH4.

The following signals, which are furnished to the ROPSELECTx 1500 (see FIG. 15), become valid early in phase one of the DECODE2 stage. Signal ROPxDI[63:0] contains the raw instruction bytes from the byte queue right justified according to the last byte of the allocated x86 instruction. For an instruction containing four byte displacement/immediate data, for example, ROPxDI[63:0] would contain the raw prefix byte, the raw opcode byte, the raw modify r/m byte, the raw sib byte, and the four raw bytes of the displacement/immediate data. Signal ROPPRDTKN[3:0] is the allocated non-sequential indication from the last byte of the x86 instruction. Signal ROPxCLM[1:0] is the allocated cache column indication from the last byte of the x86 instruction.

Signal CS32X16 from the code segment register, which provides a 32 bit or 16 bit indication, is a processor state related signal. The signal is in effect changed in a serial manner and so is static when IDECODE 108 is active.

Control of Byte Queue Shift Operations

The byte queue entries of pre-decoded x86 instructions for which ROP dispatch is completed are shifted out of the BYTEQ 106 to provide space for the elements of new pre-decoded x86 instructions. The BYTEQ 106 comprises a barrel shifter capable of shifting from 0 to 15 locations in one cycle. Shifting of the BYTEQ 106 is controlled by signals D1SHFT[15:0] through D4SHFT[15:0] and DISPATCH0 through DISPATCH4, which advantageously are generated by the ROPMUX 700 and the IDECCNTL 760 respectively at appropriate times in the DECODE1 stage so that the BYTEQ 106 can be shifted in a timely manner for the next decode cycle.

Since the IDECODE 108 is a two-stage decoder with dispatch occurring in the DECODE2 stage, the BYTEQ 106 needs to be shifted before the actual number of ROPs dispatched is known. The ROPMUX 700 receives various inputs from the ICACHE 104 that are valid in early phase one of the DECODE1 stage, and by late phase one of the DECODE1 stage indicates back to the ICACHE 104 by signals D1SHFT[15:0] through D4SHFT[15:0] how to shift the byte for each of the possible dispatch scenarios, i.e. the dispatch of 0, 1, 2, 3, or 4 ROPs. The ICACHE 104 uses this information in phase two of the DECODE1 stage to set up the load/shift logic for the BYTEQ 106. Very late in phase two of the DECODE1 stage, the IDECCNTL 760 communicates a prediction of how many ROPs are going to be shifted out of the BYTEQ 106, and the ICACHE 104 shifts and fills the byte queue dynamically in phase one of the following DECODE1 stage. A prediction is used because information regarding the full status of the functional units and the ROP types is not known until after the DECODE1 stage.

Evaluation of DSHFT[15:0] through D4SHFT[15:0] in the ROPMUX 700 begins as soon as the dispatch positions 0, 1, 2 and 3 receive pre-decoded x86 instructions from the BYTEQ 106, and DISHFT[15:0] through D4SHFT[15:0] become valid late in the first phase of the DECODE1 stage. D1SHFT[15:0] indicates the byte queue entry that should be shifted to the head of the BYTEQ 106 if only one ROP is dispatched, D2SHFT[15:0] indicates the byte queue entry that should be shifted to the head of the BYTEQ 106 if two ROPs are dispatched, D3SHFT[15:0] indicates the byte queue entry that should be shifted to the head of the BYTEQ 106 if three ROPs are dispatched, and D4SHFT[15:0] indicates the byte queue entry that should be shifted to the head of the BYTEQ 106 if four ROPs are dispatched. Advantageously, the evaluation of DISHFT[15:0] through D4SHFT[15:0] is initiated as soon as possible and well before the actual number of ROPs dispatched is known to avoid wasting clock cycles.

The prediction of how many ROPs are going to be dispatched is performed in the IDECCNTL 760 and communicated to the ICACHE 104 by an appropriate one of the signals DISPATCH0 (no ROPs dispatched) through DISPATCH4 (four ROPs dispatched). Signals DISPATCH0 through DISPATCH4 select none of or a corresponding one of the signals DOSHFT[15:0] through D4SHFT[15:0], which then controls the shifting of the BYTEQ 106.

In the embodiment of FIG. 9, prediction is achieved by applying two rules. First, past predicted taken branches (next ROP nonsequential) are not dispatched to simplify program counter maintenance. Second, the two ROPs used for a floating point operation need to be dispatched in the same cycle and, in one embodiment, from the first two dispatch positions, or in an alternative embodiment, from two of the first three dispatch positions. Typically, if all ROPs are fastpath integer ROPs, the IDECCNTL 760 predicts a four ROP dispatch. Note that many different prediction rules are possible, even rules permitting past predicted taken branches to be dispatched and permitting two floating point ROPs of a floating point operation to be dispatched from any dispatch position and even from different dispatch windows, although the use of such rules would require greater speed for performing the more complex logical calculations.

The prediction is based on signals QVAL[3:0] and QPRDTKN[3:0] from the ROPSELECTx 1500 (FIG. 15), all of which become valid in mid phase two of the DECODE1 stage, as well as the upper five bits of the raw x86 opcode byte. The signal QVAL[3:0] is a phase two latched version of MUXVAL. QVAL[3:0] is used in the prediction to take into account non-dispatch of invalid ROPs. The signal QPRDTKN[3:0], which indicates whether ROPs in the dispatch window are in a predicted taken branch, is a phase two latched version of BYTEQNS[x]. QPRDTKN[3:0] is used in the prediction to detect past predicted taken branches (next ROP nonsequential) so that subsequent ROPs in the dispatch window are not dispatched.

The actual number of ROPs dispatched is not known until very late in the second phase of DECODE2, based on various signals from the functional units 131–136 and from the ROB 114. These signals include the flmctional unit full signals ALU0FULL, ALU1FULL, LSFULL[1:0], BRNFULL[:1:0] and FPTFULL; the reorder buffer allocation indication ROBSTAT[3:0]; and the ROB empty indication ROBEMPTY. For each valid ROP at decode, the corresponding bit of ROBSTAT[3:0] indicates whether a location of the ROB 114 is available for allocation to it. The ROB empty indication ROBEMPTY is asserted to indicate when a serialization event can be initiated.

Because the prediction technique in the embodiment of FIG. 9 yields a prediction which is equal to or greater than actual number of ROPs eventually dispatched, the actual number of ROPs dispatched may not agree with the prediction made late in the first phase of the DECODE1 stage. In this event, the IDECODE 108 stalls until the remaining undispatched ROPs are dispatched in subsequent cycles. The stall is controlled by signal DISPALL from the IDEC-CNTL 760 to the ROPMUX 700. If DISPALL does not assert by the late second phase of the DECODE1 stage, it signals to the following phase one that the ROPs which should dispatch in the DECODE2 stage will not dispatch. When DISPALL is not asserted, latches in the ROPSE-LECTx 1500 which latch the DECODE1 stage signals for the DECODE2 stage are not activated so that DECODE1 signals are prevented from moving into the DECODE2 stage.

In the example of FIG. 11, ROPMUX 700 directs the elements of the first pre-decoded x86 instruction (I1-OC, I1-MRM, and I1-SIB) to the first, second and third dispatch positions, and the elements of the second pre-decoded x86 instruction (I2-PREC, I2-OC, I2-MRM, and I2-SIB) to the third dispatch position. Both D1SHFT and D2SHFT are assigned the bit pattern "0000000000000001" (the position of the binary 1 in the bit pattern indicates the byte that is to be shifted to the head of queue position) representing no shift, since the first x86 instruction should remain at the head of the BYTEQ 106 if less than three ROPs, the number needed to fully execute the first x86 instruction, are dispatched. D3SHFT is assigned the bit pattern "0000000000001000" representing shift left three entries (put the fourth byte at the head of queue), since the first x86 instruction I-1 is fully executed if ROPs are dispatched from the first three dispatch positions, and therefore should be shifted out of the BYTEQ 106 and the second pre-decoded x86 instruction I-2 shifted to the front of the BYTEQ 106 to make room for new pre-decoded x86 instructions. D4SHFT is assigned the same bit pattern "0000000000001000" representing shift left three entries, since the second x86 instruction I-2 should go to and remain at the head of the BYTEQ 106 if less than three ROPs, the number needed to fully execute the second x86 instruction I-2, are dispatched.

Subsequently, very late in the second phase of the DECODE1 stage, DISPATCH0 is asserted if no ROPs are predicted dispatched in the current cycle, resulting in no shifting of the BYTEQ 106 in the next cycle; DISPATCH1 is asserted if only one ROP from the first dispatch position is predicted dispatched in the current cycle, resulting in no shifting of the BYTEQ 106 in the next cycle; DISPATCH2 is asserted if two ROPs are predicted dispatched from the first two dispatch positions in the current cycle, resulting in no shifting of the BYTEQ 106 in the next cycle; DISPATCH3 is asserted if three ROPs are predicted dispatched from the first three dispatch positions in the current cycle, resulting in a three entry left shift of the BYTEQ 106 in the next cycle; and DISPATCH4 is asserted if four ROPs are predicted dispatched from all of the dispatch positions in the current cycle, resulting in a three entry left shift of the BYTEQ 106 in the next cycle. FIG. 12 shows the positions in the BYTEQ 106 of the second pre-decoded x86 instruction I-2, the third pre-decoded x86 instruction I-3, and the fourth pre-decoded x86 instruction I1 after a dispatch of all four ROPs in the prior decode cycle.

ROPMUX-FASTCONVx-ICOMMONx-ROPSELECTx Operation

FASTCONVx 902 and ICOMMONx 904 are involved in the fast conversion of many types of "simple" x86 instructions into ROPs using signals received from the ROPMUX 700.

Consider first the signals applied to the FASTCONVx 902. ROPxNUM specifies the number of the ROP to be generated at ROP position x in the sequence of ROPs needed to execute the x86 instruction, wherein the total number of ROPs in the sequence is specified by bits BYTEQP1[a] and BYTEQP0[a] corresponding to the byte queue element "a" in which bit BYTEQP2[a] is set. In the example of FIG. 11, BYTEQP2[0] is set, which corresponds to the first byte queue element II-OC containing the ADD opcode. ROPONUM presented to FASTCONV0 is 00, ROP1NUM presented to FASTCONV1 is 01, ROP2NUM presented to FASTCONV2 is 10. In the example of FIG. 11, BYTEQP2[5] is also set, which corresponds to the opcode in the second instruction I2 contained in the sixth byte queue element from the head of the BYTEQ 106. ROP3NUM presented to FASTCONV3 is 00.

Signal ROPxPRE[2:0] from the ROPMUX 700 are bits from a consolidated prefix and provide the information set forth in Table 3. In particular, bit [2] indicates whether an operand size prefix is present. An operand size prefix inverts the sense of the default operand size specified by the default operand size attribute specified by the DefaultAttr flag in the code segment descriptor register CS_desc (not shown). Bit [1] indicates whether an address size prefix is present. An address size prefix inverts the sense of the default address size specified by the default address size attribute specified by the DefaultAttr flag in the code segment descriptor register CS_desc (not shown). Bit [0] indicates whether a two byte opcode is present. The ICACHE 104 detects all such two opcode instructions, and represents the first indicator opcode as ROPxPRE[0].

For the example of FIG. 11, the raw x86 instruction from which the first pre-decoded instruction I1 is derived is the ADD instruction shown in FIG. 6, which has no prefix and is a single opcode instruction. Accordingly, ROPOPRE[2:0], ROP1PRE[2:0] and ROP2PRE[2:0] in dispatch positions 0, 1 and 2 respectively are 000. If the second raw x86 instruction I2 is presumed to be a two opcode instruction such as the "move with sign extension" instruction MOVSX added for the 386 instruction set, and is presumed to have two prefixes which invert the sense of the default operand size and the default address, ROP3PRE[2:0] in dispatch position 3 would be 111.

Also for the example of FIG. 11, signals ROP0OP, ROP1OP and ROP2OP are the signal BYTEQ0[7:0], which is the x86 ADD instruction byte 00000001, while signal ROP3OP is the signal BYTEQ5[7:0], which is the second instruction byte of the raw x86 instruction from which pre-decoded x86 instruction I2 is derived.

Also for the example of FIG. 11, signals ROP0MODRM [7:0], ROP1MODRM[7:0] and ROP2MODRM[7:0] are the signal BYTEQ1[7:0], which is the mod r/m byte 00000011 of the raw x86 instruction from which the pre-decoded x86 instruction I1 is derived. Signal ROP3MODRM[7:0] is the signal BYTEQ6[7:0], which is the mod r/m byte of the raw x86 instruction from which pre-decoded x86 instruction I2 is derived.

Using any suitable combinatorial logic or programmable array logic, the FASTCONVx 902 in each of the dispatch positions converts ROPxOP[7:0] into appropriate signals for use by the ROPSELECTx 1500 in assembling ROP control and data signals for dispatch position x and encoding its operand and destination pointers. The converted ROP is an appropriate one of the ROPs in the sequence to which the raw x86 instruction maps, based on ROPxNUM[1:0] and determined in accordance with ROPxPRE[2:0] and ROPxMODRM[7:0]. The FASTCONVx 902 performs these functions for all of the simple x86 instructions, including, illustratively, register-to-register instructions, memory-to-register instructions, register-to-memory instructions, arithmetic instructions, shift instructions, and branching instructions.

Figure 15:
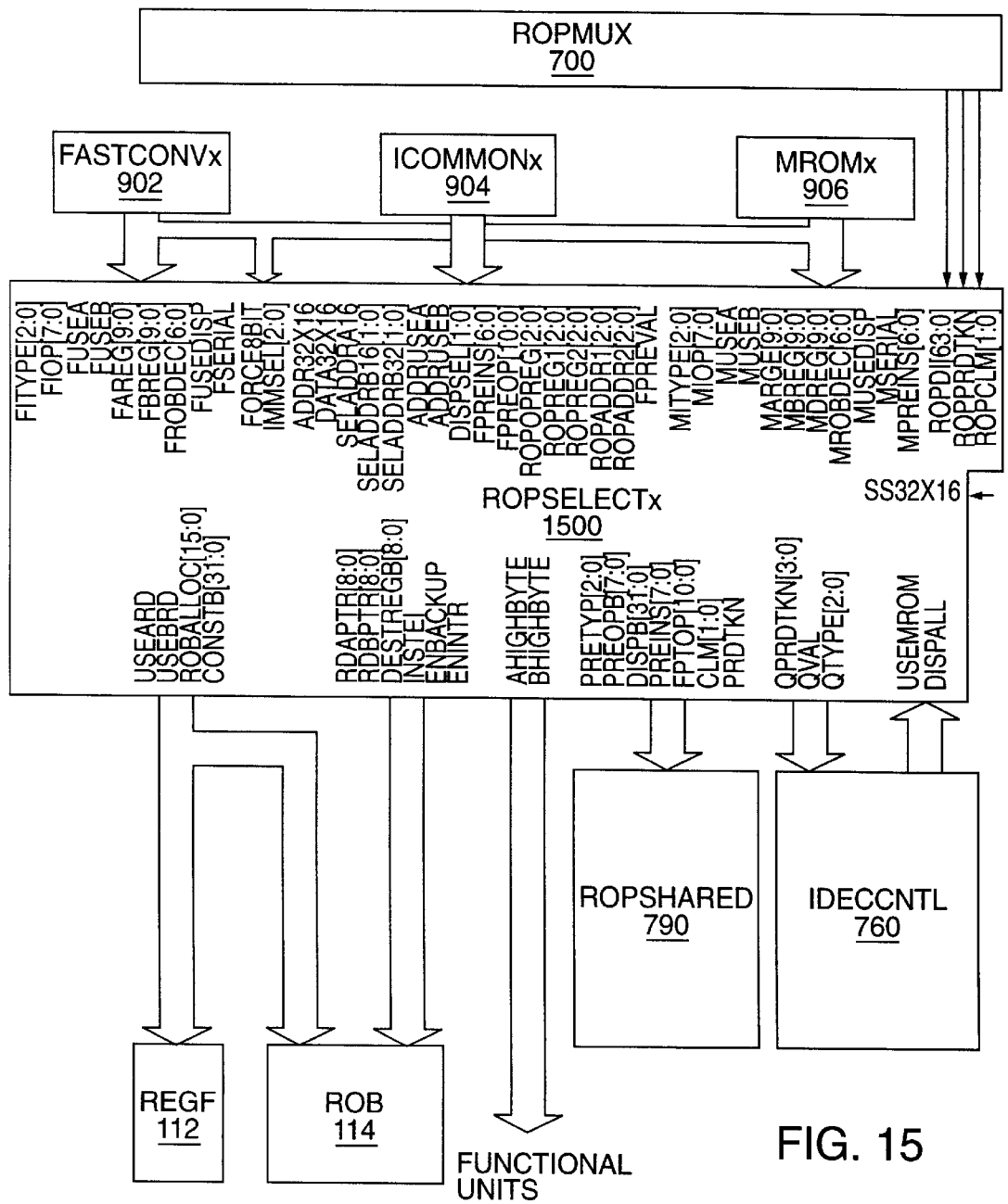
FIG. 15 is a data-address-control signal level block diagram showing interconnections between the ROP select functional block of the IDECODE and various other functional blocks of the processor of FIG. 1.
Figure 16:
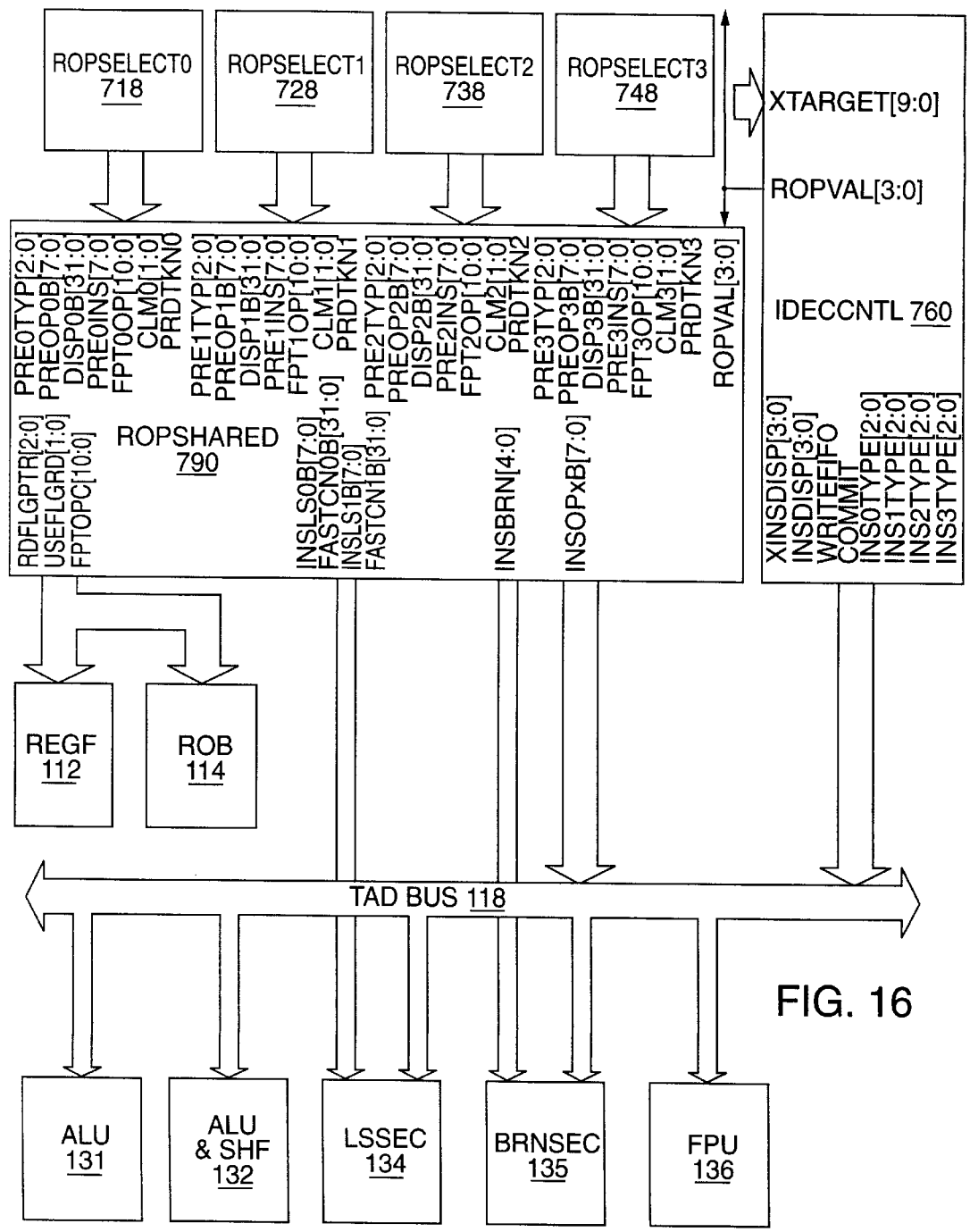
FIG. 16 is a data-address-control signal level block diagram showing interconnections between the ROP shared functional block of the IDECODE and various other functional blocks of the processor of FIG. 1.

The signals at the output of the FASTCONVx 902, which become valid late in phase two of the DECODE1 stage, are ITYPE[2:0], which indicates the type of ROP for selecting an appropriate one of the functional units; IOP[7:0], which indicates the RISC opcode itself; USEA, which indicates that the A operand should be used in constructing the ROP; USEB, which indicates that the B operand should be used in constructing the ROP; AREG[9:0], which contains the operand pointer into the REGF 112 and the ROB 114 for the A operand; BREG[9:0], which contains the operand pointer into the REGF 112 and the ROB 114 for the B operand; DREG[9:0], which contains the destination pointer into the REGF 112 and the ROB 114; ROBDEC[6:0], which furnishes integer and floating point flag update control information to the ROB 114; USEDISP, which indicates that the displacement field should be used; SERIAL, which provides for a serialization event such as state variable updates and test variable reads by indicating that the pipeline must empty before further ROPs are dispatched; FORCE8BIT, which indicates that the operation is a byte-oriented operation, and IMMSEL[2:0], which indicates what portions of the immediate data should be selected. These signals are fliished to ROPSELECTx 1500 under the same name but with an "F" prefix, as shown in FIG. 15.

Using any suitable latched combinatorial logic, the ICOMMONx 904 in each of the dispatch positions pipelines and converts its input signals into control signals for use by the ROPSELECTx 1500 in encoding ROPs, and also provides certain information for floating point operations. The ICOMMONx 904 performs these functions for all x86 instructions, including the simple instructions converted in FASTCONVx 902 as well as the rarely used and complicated instructions read out of the MROM0 716, MROM1 726, MROM2 736, and MROM3 746 under control of the IDECCNTL 760.

The inputs to the ICOMMONx from the ROPMUX 700 are as follows. Bits ROPxPRE[7:1] are from the consolidated prefix byte, if present, and provide the information stated in Table 3. In particular, bits [7:5] indicate whether a default segment should be overridden, and if so, by which segment descriptor. Bits [4:3] indicate whether a lock prefix or a repeat prefix is present, and if so, which prefix. Bit [2] indicates whether an operand size prefix is present. Bit [1] indicates whether an address size prefix is present. In the example of FIG. 11, the raw x86 instruction from which the first pre-decoded instruction I1 is derived is the ADD instruction shown in FIG. 6, which has no prefix and is a single opcode instruction. Accordingly, ROP0PRE[7:1], ROP1PRE[7:1] and ROP2PRE[7:1] in dispatch positions 0, 1 and 2 respectively are 000. If the second raw x86 instruction I2 is presumed to be a two opcode instruction such as the "move with sign extension" instruction MOVSX added for the 386 instruction set, and is presumed to have two prefixes to indicate a CS segment override as well as to invert the sense of the default operand size and the default address, ROP3PRE[2:0] in dispatch position 3 is 0010011. Bits ROP0OP[2:0], ROP1OP[2:0] and ROP2OP[2:0] are latched from bits BYTEQ0[2:0], which is the x86 ADD instruction byte portion 001, while bits ROP3OP[2:0] are the bits BYTEQ5[2:0], which is a portion of the second instruction byte of the raw x86 instruction from which pre-decoded x86 instruction I2 is derived. Bits ROP0MODRM[7:0], ROP1MODRM[7:0] and ROP2MODRM[7:0] are from BYTEQ1 [7:0], which is the mod r/m byte 00000011 of the raw x86 instruction from which the pre-decoded x86 instruction I1 is derived. Bits ROP3MODRM[7:0] are from BYTEQ6[7:0], which is the mod r/m byte of the raw x86 instruction from which pre-decoded x86 instruction I2 is derived. Similarly, bits ROP0SIB[7:0], ROP1SIB[7:0] and ROP2SIB[7:0] are from BYTEQ2[7:0], which is the sib byte 11001011 of the raw x86 instruction from which the pre-decoded x86 instruction I1 is derived. Bits ROP3SIB[7:0] are from BYTEQ7[7:0], which is the sib byte of the raw x86 instruction from which pre-decoded x86 instruction I2 is derived.

The ICOMMONx 904 isolates certain bits of the input signals ROPxOP[2:0], ROPxMODRM[7:0] and ROPxSIB [7:0], which it furnishes to the ROPSELECTx 1500 for the determination of destination and operand pointers as well as register selection and other control information. Register pointers may appear in any one or more of five locations: bits [2:0] of the opcode byte, bits [5:3] of the modrm byte (REG1), bits [2:0] of the modrm byte (REG2), bits [5:3] of the sib byte (ADDR1), bits [2:0] of the sib byte (ADDR2). These bits are used by the ICOMMONx 904 for obtaining opcode and register information for ROP instructions, which is fuimshed in signals ROPOPREG[2:0], ROPREG1[2:0], ROPREG2[2:0], ROPADDR1 [2:0], and ROPADDR2[2:0]. Instruction format and timing information is set forth in more detail in Appendix E of a publication of the Intel Corporation entitled "Intel486™ Microprocessor Family: Programmer's Reference Manual", Santa Clara, Calif., 1992, which is incorporated herein by reference in its entirety.

MUXVAL[3:0] contains four valid bits for respective ROPs in the four dispatch positions. Each bit MUXVALx for dispatch position x is obtained from the valid bit of the pre-decoded x86 instruction from which the ROP in the dispatch position x is obtained. MUXVALx for an ROP in dispatch position x is asserted only if the pre-decoded source x86 instruction of the ROP is valid and the ROP itself is valid.

The signals at the output of the ICOMMONx 904, which are fuimshed to the ROPSELECTx 1500, are shown in FIG. 15. These signals become valid early in phase one of the DECODE2 stage. Many of the signals pertain to memory operand encoding. Signal ADDR32X16 indicates whether the address size is 32-bit or 16-bit Signal DATA32X16 indicates whether the operands of the instruction are double-word or word. Signal SELADDRA16 pertains to the A operand, and controls selection of the BX register or the BP register in the 16-bit addressing mode. Signal SELADDRB 16[1:0] pertain to the B operand, and controls selection of the BX, BP, SI or DI registers in the 16-bit addressing mode. Signal SELADDRB32[1:0] indicates whether REG2, ADDR1 or ADDR2 is used in the 32-bit addressing mode. In this manner, all x86 addressing modes for the fastpath and the microcode mapped path are handled in common. Signal ADDRUSEA indicates whether to use the A operand, which is not used in all addressing modes. Signal ADDRUSEB indicates whether to use the B operand, which is not used in all addressing modes. Signal DISPSEL[1:0] indicates how the displacement field is handled, and is interpreted as follows: 0xx binary—zero extend; 1xx binary—sign extend to 32 bits; x00 binary—none; x01 binary—8 bit; x10 binary—16 bit; x11 binary—32 bit. Signal FPREINS[6:0] is a pre-instruction load/store signal which acts as a mode override for the LSSEC 134. When asserted, bit 6 forces the 32-bit addressing mode without changing the processor state. When asserted, bit 5 forces a locked access. When 0, bit 4 commands the use of the address segment indicated by the x86 instruction; when 1, bit 4 indicates that the segment is specified in bits [3:0]. Some of the signals are used in floating point operations. Signal FPREOP[10:0] contains bits ROPxMODRM[2:0] and ROPxOP[7:0]. Signal FPRE-VAL is a latched version of MUXVAL. Signals ROPOPREG [2:0], ROPREG1 [2:0], ROPREG2[2:0], ROPADDR1 [2:0] and ROPADDR2[2:0] are discussed above.

ROPMUX-IDECCNTL-MROMx-ROPSELECT Operation

Microcode ROM instruction sequencing is controlled by the IDECCNTL 760, which establishes an entrypoint based on prefix, opcode, mod r/m, sib, processor state, and exception information, and uses the entrypoint for reading an ROP sequence from the MROM0 716, MROM1 726, MROM2 736, and MROM3 746 at four ROPs per cycle. The sequencing logic is located in the IDECCNTL 760, which receives signal MROMC[11:0] from the control ROM 750 and furnishes signals GOMROM and MROMMADDR[9:0] to access the MROM0 716, MROM1 726, MROM2 736, MROM4 746, and the control ROM 750.

FIG. 10A shows steps for controlling the sequencing of ROPs. Signal ROPMROM is asserted when a microcode mapped pre-decoded x86 instruction is at the head of the BYTEQ 106. As indicated by operation 1022, the IDEC-CNTL 760 determines the MROM entrypoint based on four elements received from the microcode mapped x86 instruction at the head of the BYTEQ 106. The four elements are a consolidated prefix data element, an opcode element, a mod r/m element, and a sib element. If an element is not present in the pre-decoded x86 instruction, as determined from the start and end bits of the instruction, the information received at the dispatch position corresponding to the absent element is treated as "don't care" information.

Figure 13:
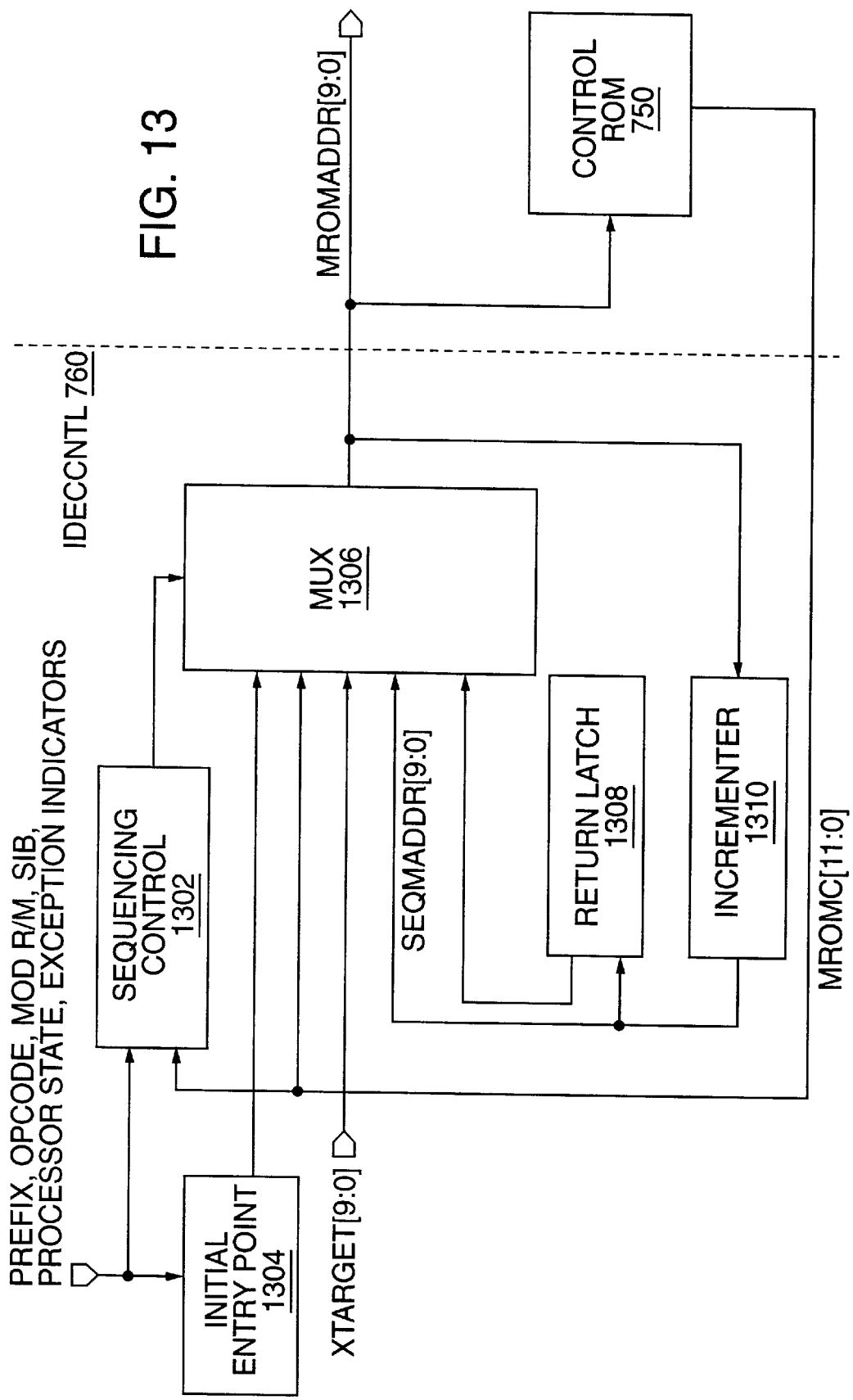
FIG. 13 is a functional block diagram of a microcode ROM controller useful in the instruction decoder of FIG. 7.

As indicated by operation 1024, the IDECCNTL 760 uses signals ROP0PRE, ROP0OP, ROP0MODRM, and ROP0SIB for accessing MROMx 906. This is shown as event 808 in FIG. 8. FIG. 13 is a block diagram of the MROM control portion of the IDECCNTL 760. The IDEC-CNTL 760 accesses the MROMx 906 of the several dispatch positions in the second phase of the DECODE1 stage. Sequencing control logic 1302 is a state machine of any suitable design which controls a multiplexer 1306 for furnishing microcode ROM entrypoint addresses on MROMADDR[9:0]. The sequencing control logic 1302 is responsive to a control word from the control ROM 750, and the prefix, opcode, mod r/m, sib, processor state, and exception indication signals from various units of the IDECODE 108 and other units of the processor 100. An initial microcode entrypoint is generated by an initial entry point generator 1304, which is a programmable logic array of any suitable design, based on ROP0PRE, ROP0OP, ROP0MODRM and ROP0SIB, which become valid before the second phase access of the microcode ROM; see ROP-MUX event 806 in FIG. 8.

For accessing MROM0 716, MROM1 726, MROM2 736, and MROM3 746 at the beginning of a particular microcode ROM sequence, the output of the initial entrypoint generator 1304 is selected by the multiplexer 1306 and applied to the control ROM 750 as well as to the MROMx 906 in each of the dispatch positions x. Subsequent MROMx 906 accesses are selected from an incrementer 1310, a return latch 1308, and the bus XTARGET[9:0], depending on the sequencing mechanism. The positions of the ROPs in the MROMx 906 are fixed. Accordingly, all ROPs in a particular line are dispatched before those in the next line are dispatched. To simplify the logic that determines when the last ROP of a line has been dispatched, partially filled lines right justify the ROPs to the third dispatch position 740 and indicate a null type in the unused dispatch positions, if any.

Two mechanisms are used for controlling the sequencing of ROPs: the sequence control field, and the microbranch ROPs. The sequence control field takes effect in the DECODE1 stage, which is the stage in which the MROMx 906 is accessed. On the other hand, microbranch ROPs are dispatched to the BRNSEC 135 for execution, and so have a delayed effect.

Figure 14:
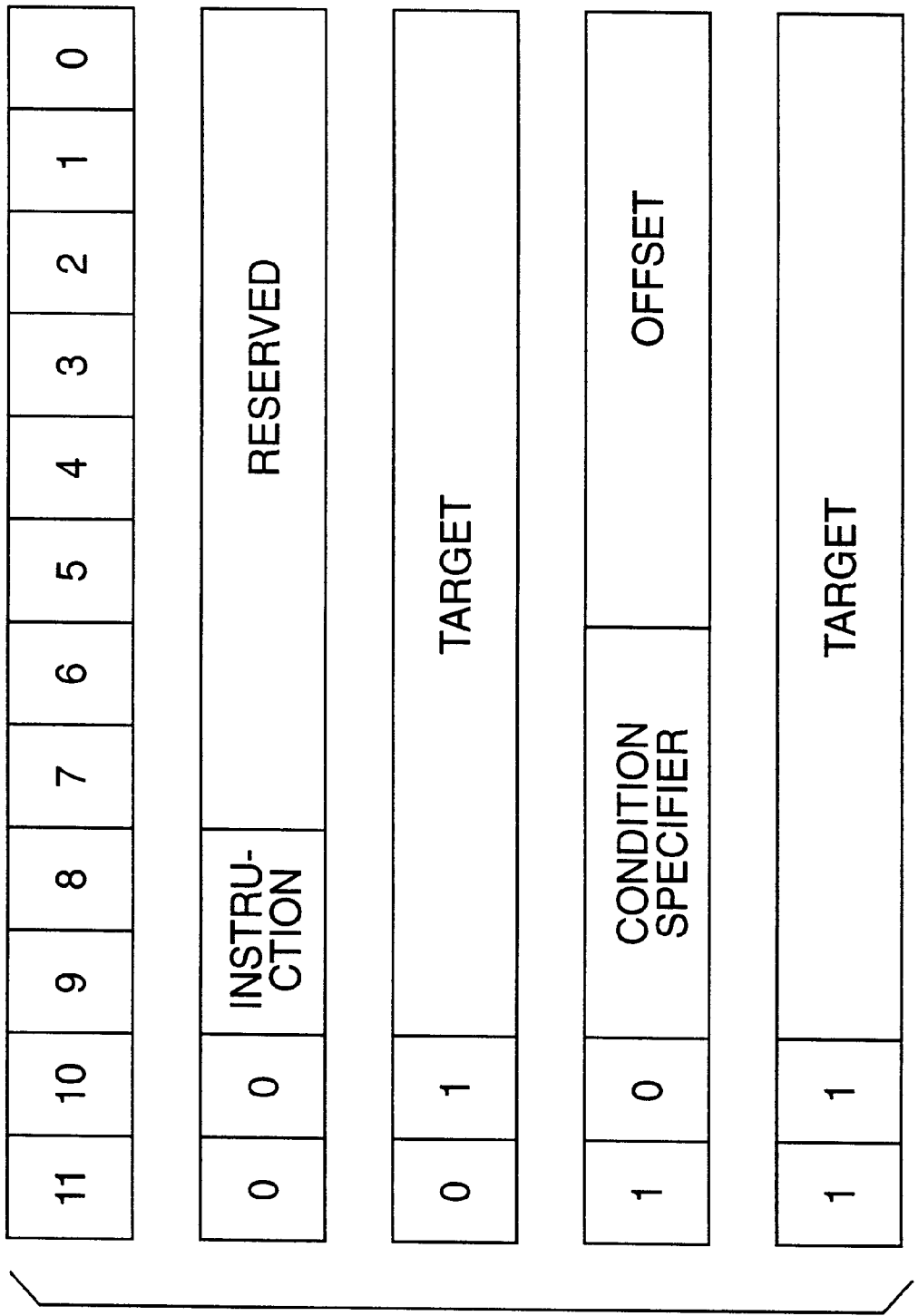
FIG. 14 is a pictorial representation of various formats for the contents of a control ROM useful in the microcode ROM controller of FIG. 11.

The sequence control field provides several capabilities through the incrementer 1310 and the return latch 1308: microcode subroutine call/return (single level supported), unconditional branching to any MROM location on a block aligned basis, conditional branching within plus or minus thirty-two blocks based on the processor state, and indicating end-of-sequence. The control words of the sequence control field are stored in the control ROM 750, which contains 1024 control words. Each control word is 12 bits in length. In the illustrative encoding scheme shown in FIG. 14, one control word applies to each "group of four" dispatch window. Each control word is interpreted in a manner dependent on its leading bits. If control ROM bits [11:10] are 00, a "miscellaneous control" format field is indicated. Bits [9:8] of the miscellaneous control format field are 00 binary to indicate a sequencing implemented by the incrementer 1310, are 01 binary to indicate an unconditional branch to the value contained in the return latch 1308 after the four ROPs in the current dispatch window are dispatched, and are 10 to indicate an exit. If control ROM bits [11:10] are 01, an unconditional branch is indicated, with the branching address being indicated by bits [9:0]. If control ROM bits [11:10] are 10, a conditional branch is indicated to SEQMADDR[9:5]|"branch taken address" based on a "condition specifier" (testing prefixes, opcode, mod r/m, sib, processor state, or exception indications) after the four ROPs in the current dispatch window are dispatched. The condition is specified by bits [9:6] and the branching offset is specified by bits [5:0]. If control ROM bits [11:10] are 11, a call target is indicated, with the target being indicated by bits [9:0]. A "call target" causes an unconditional branch to a "subroutine entrypoint" after the four ROPs in the current dispatch window are dispatched, and the return latch 1308 is updated with the next sequential address. Note that the microsubroutine call control word is also useful as an unconditional branch absolute if the "return latch 1308" is not currently valid.

Microbranch ROPs are performed like instruction-level branches, being dispatched to the BRNSEC 135 for execution and subject to correction on mispredictions. Microbranches are distinguished from instruction-level branches by the decode position of the microbranch and an exit code in the sequence control field. Instruction-level branch ROPs are the last ROP in a sequence, and hence appear in the third dispatch position with a sequence exit code. Other branches are considered microbranches. Bit[0] in INSBRN accompanies the ROP to the BRNSEC 135. Also an MROM address is sent rather than an instruction address for target address formation or branch correction. On a microbranch correction, the BRNSEC 135 indicates to the IDECODE 108 via the XTARGET bus 103 that the correction address is an MROM address rather than a PC. Microbranch ROPs basically offer an unconditional branch capability and conditional branching based on a register value being zero, non-zero, positive, or negative.

The ROPSELECTx and ROPSHARED

The ROPSELECTx 1500, which is present in each dispatch position, selects information from the FASTCONVx 902, ICOMMONx 904, MROMx 906, and ROPMUX 700 and directs this information to the REGF 112 and the ROB 114, as well as to various functional units of the processor 100. The ROPSELECTx 1500 also furnishes information to ROPSHARED 790 for dispatch to shared resources. Information dispatched includes an A operand pointer, a B operand pointer, a destination pointer, information on the instruction type, the instruction opcode, interrupt enable, backup enable, and instruction end, and constant values. The various data and control paths between the ROPSELECTx 1500 and other elements of ICACHE 104 and the register file REGF 112, the reorder buffer ROB 114, and an illustrative functional unit FU are shown in FIG. 15.

The various input signals associated with the ROPSELECTx 1500 become valid at different times in the DECODE1 and DECODE2 pipeline stages. One of the signals, SS32X16 is the 32 bit or 16 bit indication from the stack segment register, is a processor state related signal. The signal is in effect changed in a serial manner and so is static when EDECODE 108 is active.

Late in phase one of the DECODE1 stage, raw x86 instruction information from the ROPMUX 700 becomes valid. ROPDI[63:0] contains the raw instruction bytes from the BYTEQ 106 right justified according to the last byte of the allocated x86 instruction. ROPPRDTKN is the allocated non-sequential indication from the last byte of the allocated x86 instruction, and is used by the BRNSEC 135 to determine whether branch was predicted taken or not taken when the instruction was read out. ROPCLM[1:0] is the allocated cache column indication from the last byte of the allocated x86 instruction, and is used to access the appropriate locations of the ICACHE 104 during cache update.

Early in phase two of the DECODE1 stage, some of the general inputs become valid. USEMROM indicates when asserted that the ROPSELECT MROMx 906 inputs should be used instead of the FASTCONVx 902 inputs.

The signals from the FASTCONVx 902, ICOMMONx 904 and MROMx 906 become valid early in the first phase of the DECODE2 stage.

The ROPSHARED 790 allocates dispatch information to shared resources according to valid types. In mid phase one of the DECODE2 stage, input ROPVAL[3:0], which are the ROP valid bits from the IDECCNTL to the ROB 114, become valid. The ROPSHARED 790 also receives signals from the ROPSELECTx 1500 in each of the dispatch positions for processing and dispatch to shared resources. These signals become valid in mid phase one and early phase two of the DECODE2 stage.

In mid phase one of the DECODE2 stage, the instruction type PRExTYP[2:0] (x=0,1,2,3) and the opcodes PREOPxB [7:0] (x=0,1,2,3) from the ROPSELECTx 1500 in each of the dispatch positions become valid. Instruction type information PRETYP[2:0] is selected from MITYPE and FITYPE based on USEMROM. Opcode information PREOPB[7:0] assumes the value MIOP or FIOP based on USEMROM, although PREOPB[7:6] is replaced by the destination size DESTSIZE for some opcode types.

In early phase two of the DECODE2 stage, the following inputs to the ROPSHARED 790 from the ROPSELECTx 1500 become valid: DISPxB[31:0] (x=0,1,2,3), PRExINS [7:0] (x=0,1,2,3), FPTxOP[10:0] (x=0,1,2,3), CLMx[1:0] (x=0,1,2,3), and PRDTKNx. DISPxB[31:0] is the 32-bit displacement field which is selected from ROPDI[63:0] depending on the value of DISPSEL[1:0] and FUSEDISP and MUSEDISP as follows. DISPSEL[1:0] is determined from the address mode and is interpreted as follows: 00 binary—none; 01 binary—8 bit, sign extend to 32 bits; 10 binary—16 bit, sign extend to 32 bits; and 11 binary—32 bit. FUSEDISP/MUSEDISP determines whether or not the displacement should actually be used. When FUSEDISP/ MUSEDISP is not asserted, a zero displacement is supplied. PRExINS[7:0] is extra opcode information for loads and stores, with PREINS[7:6] being scale bits, PREINS[5] being an address "32X16" bit, PREINS[4] being a lock bit, and PREINS[3:0] being segment bits. PRExINS is selected from the fast path pre-instruction information FPREINS or from the microcode ROM pre-instruction information MPREINS in accordance with USEMROM and DISPALL. FPTOPx [10:0] is a delayed version of FPREOP[10:0]. CLMx[1:0] is the cache column from the last byte of the x86 instructions, a delayed version of ROPCLM. PRDTKN[3:0] is the non-sequential indications, a delayed version of ROPPRDTKN.

The ROPSELECTx 1500 in each of the dispatch positions and the ROPSHARED 790 cooperatively select operands for instructions dispatched to the various functional units of the processor 100. The REGF is illustratively a large set of general purpose registers. The register number is simply decoded by the REGF 112, and the value in the selected entry is provided. In contrast, the ROB 114 is a unit which contains a number of storage locations which are dynamically allocated to instruction results. When an instruction is decoded, its result value is assigned a reorder-buffer location, and its destination-register number is associated with this location, in effect renaming the destination register to the reorder buffer location. When a subsequent instruction refers to the renamed destination register to obtain the value stored in the register, the instruction obtains instead the value stored in the reorder buffer or a tag (the index into the reorder buffer) for this value if the value has not yet been computed. To provide this capability, the ROB 114 is illustratively implemented as a content addressable memory, so that the ROB 114 compares the register number to the register numbers in all entries, and returns the value or tag in the entry which has a matching register number, if any.

When an instruction is decoded, the register numbers of its source operands are used to access the ROB 114 and the REGF 112 simultaneously. If the reorder buffer does not have an entry whose register number matches the source register number, then the value in the register file is selected as the operand. If the reorder buffer does have one or more matching entries, the value of the most recent entry is selected if available, and otherwise the tag for the value is selected. Either the value or its tag is copied to an appropriate one of the reservation stations of the various functional units in the processor 100.

The operand furnishing function is implemented using various outputs of the ROPSELECTx 1500 and the ROP-SHARED 790 furnished to the REGF 112 and the ROB 114. These outputs become valid during the DECODE2 stage in preparation for the EXECUTE stage. Signals USEARD, USEBRD, and ROBALLOC from the ROPSELECTx 1500 to the REGF 112 and the ROB 114, and signals RDAPTR, RDBPTR, and DESTREGB from the ROPSELECTx 1500 to the ROB 114 become valid in mid phase one of DECODE2. USEARD is a register use indicator to the ROB 114 and the REGF 112. USEARD is derived from FUSEA, MUSEA, and ADDRUSEA depending on respectively whether the x86 instruction is being processed in the FAST-CONVx 902, is being processed in the MROMx 906, or involves a special x86 address mode. USEBRD is the B operand version of USEARD, and is derived in a manner similar to USEARD. ROBALLOC[15:0] indicates ROP allocation information and is derived from FROBDEC or MROBDEC depending on USEMROM and DISPALL. ROBALLOC contains 4 bits of allocation data for each valid ROP at decode, encoding its requirements for register write-back in bit [3] and its requirements integer/floating point flag modifications in bits [2:0]. RDAPTR[8:0] is the A source operand pointer to the ROB 114. Generally, RDAPTR[6:3] is derived from inputs ROPOPREG, ROPREG1, and ROPREG2 from ICOMMONx 904 when the instruction involves a destination or a source register, or a special x86 address mode. However, RDAPTR is obtained from FAREG or MAREG when the x86 instruction is being processed in the FASTCONVx 902 or in the MROMx 906. RDBPTR [8:0] is the B operand version of RDAPTR, and is derived in a manner similar to RDAPTR except from the B operand version of the input signals. DESTREGB[8:0] is the destination pointer to the ROB 114, and is derived in a manner similar to RDAPTR except from the destination version of the input signals.

Dispatched instructions also require type and opcode information, which is furnished by the IDECCNTL 760 and which also become valid during the DECODE2 stage in preparation for the EXECUTE stage. Signal INSDISP[3:0] indicates the dispatch positions from which ROPs are to be dispatched in the current cycle. Each of the type signals INSxTYPE[2:0] alerts a particular functional unit to process an instruction from dispatch position x. A different type signal is used for each of the functional units, which provides various capabilities, including the capability of toggling arithmetic and logic operations between the ALU0 131 and the ALU1 132, as well as the capability of using one function unit for multiple purposes (e.g., ALU1 for arithmetic and logic operations as well as for shift operations). Signal XINSDISP[3:0] indicates which ROPs are dispatched. Signal WRITEFIFO indicates whether the BRNSEC 135 should write a predicted taken address on the XTARGET bus into a prediction FIFO. Signal COMMIT indicates whether a serialized event is being dispatched.

In late phase one of the DECODE2 stage, signals RDFLGPTR and USEFLGRD from the ROPSHARED 790 to the REGF 112 and the ROB 114 become valid.

RDFLGPTR[2:0], which is the integer flag source operand pointers, is set to the appropriate RDxFLGPTR[2:0] based on the dispatch position of the first undispatched ROP mapped to the branch section BRNSEC 135. If none of the ROPs is mapped to the branch section BRNSEC 135, RDFLGPTR[2:0] is set to 0. USEFLGRD[1:0], which is the usage indication, is encoded to indicate the dispatch position of the first undispatched ROP mapped to the branch section BRNSEC 135.

In early phase two of the DECODE2 stage, the remaining signals from the ROPSELECTx 1500 and the ROP-SHARED 790 to the ROB 114 and, in some cases, the REGF 112 become valid. CONSTB[31:0] is the 32-bit constant field to the REGF 112, and is selected from ROPDI[63:0] depending on the value of IMMSEL[2:0] and FUSEB and MUSEB as follows. IMMSEL[2:0] is determined from the 486 instruction and is interpreted as follows: 0xx binary - zero extend; 1xx binary—sign extend to 32 bits; x00 binary—none; x01 binary—8 bit; x10 binary—16 bit; x11 binary—32 bit. When FUSEB/MUSEB is asserted, a zero constant is supplied. When FUSEB/MUSEB is not asserted, a constant is selected based on FBREG[9:8]/MBREG[9:8] as follows: 00 binary—none; 01 binary—use x86 instruction immediate data; 10 binary—8 bit constant from FBREG [7:0]/MBREG[7:0], no sign extend; 11 binary—8 bit constant from FBREG[7:0]/MBREG[7:0], sign extend. In addition, the 8 bit constant can be extended to 16 bits when FUSEA/MUSEA is not asserted and FBREG[9]/MBREG[9] is asserted. INSTEI is the instruction end information for the ROB 114, and is used in program counter maintenance. ENINTR is the external interrupt enable indication for the ROB 114. INSTEI and ENINTR are derived from FROB-DEC or MROBDEC depending on USEMROM and DIS-PALL. FPTOPC[10:0], which is the floating point opcode of the last x86 floating point instruction executed and which is used for state updating upon retiring of the floating point instruction, is set to the appropriate floating point opcode ROPxOP[2:0] | ROPxMODRM[7:0] based on the dispatch position of the first undispatched ROP mapped to the floating point section. If none of the ROPs is mapped to the floating point section, FPTOPC[9:0] is "don't care."

The ROPSELECTx 1500 and the ROPSHARED 790 dispatch information to various functional units in the processor 100 which becomes valid early in phase two of the DECODE2 stage. The ROPSELECTx 1500 in each of the dispatch positions furnish AHIGHBYTE and BHIGHBYTE, which are the source operand high byte indications to the functional units. AHIGHBYTE is derived from FAREG and BHIGHBYTE is derived from FBREG. The ROPSHARED 790 furnishes INSOPxB[7:0] (x=0,1,2, 3), which are the instruction ROP opcode encodings and are dispatched to the ALU0 131, the ALU1 & SHF 132, the LSSEC 134, and the BRNSEC 135.

In addition to INSOPxB, the LSSEC 134 also receives a number of outputs of the ROPSHARED 790 which become valid in mid phase two of the DECODE2 stage. INSLS0B [7:0] and INSLS1B[7:0] are extra ROP information, and are muxed and latched versions of PRExINS[7:0] mapped to the first two undispatched ROPs to the load/store section, as follows: INSLSxB[7:6], scale factor; INSLSxB[5], address size (32X16); INSLSxB[4], lock prefix; and INSLSxB[3:0] 0000 reserved, 0001 CS, 0010 DS, 0011 ES, 0100 FS, 0101 GS, 0110 SS, and others defined by microcode. FASTCN0B[3 1:0] and FASTCN1B[3 1:0] are fast displacement paths to the load/store section LSSEC 134, and are muxed and latched versions of DISPxB[31:0] mapped to the first two undispatched ROPs mapped to the load/store section. These busses are "don't care" if there is no corresponding dispatch to the load/store section.

In addition to INSOPxB, the BRNSEC 135 also receives an output of the ROPSHARED 790 which become valid in mid phase two of the DECODE2 stage. INSBRN[4:0] is extra ROP information mapped to the first undispatched ROP to the branch section (indicated by signal USEFLGRD [1:0]), as follows: INSBRN[4], exchange underflow; INSBRN[3:2], cache column selected from CLMx[1:0]; INSBRN[1], branch predicted taken selected from PRDT-KNx; and INSBRN[0], microbranch indication (1:ICACHE 104; 0:IDECODE 108).

Very late in phase two of the DECODE1 stage, DISPALL becomes valid and in conjunction with signal USEMROM controls the dispatch from ROPSELECTx 1500 as set forth in Table 4. DISPALL indicates when asserted that everything expected to be dispatched in PH1 will be dispatched.

TABLE 4

| USEMROM | DISPALL | COMMENT |
| --- | --- | --- |
| x | 0 | Try to dispatch the rest of the previous ROPs |
| 0 | 1 | Dispatch from the new FASTCONV ROPs |
| 1 | 1 | Dispatch from the new MROMx ROPs |

While the invention has been described with reference to various embodiments, it will be understood that these embodiments are illustrative and that the scope of the invention is not limited to them. Many variations, modifications, additions and improvements of the embodiments described are possible. For example, the number of ROPs in each dispatch window is illustrative, and may be varied. The size of the ICACHE 104 and the BYTEQ 106, the number of dispatch positions in the IDECODE 108, the number of source operand buses, the number of TAD buses, the number of result buses, and the number of writeback buses are illustrative, and may be varied. The phasing of many of the various signals is illustrative, and may be varied. The functions of the various signals are illustrative, and the signals may be modified by assigning some functions to other signals or by integrating other functions into the signals. Types of memory other than read only memory may be used in the MROMx 906. Additional functions may be added to the IDECODE 108. The manner of maintaining the speculative execution state of the processor is illustrative, and other arrangements such as a single reservation station may be used. These and other variations, modifications, additions and improvements may fall within the scope of the invention as defined in the claims which follow.

What is claimed is:

1. An apparatus comprising:
   an instruction queue including storage for a plurality of first-type instructions; distribution logic coupled to the instruction queue and having a plurality "m" of outputs to direct information from "n" (n≦m) of the first-type instructions to ones of the distribution logic outputs, up to m outputs;
   a plurality "m" of conversion paths respectively coupled to the distribution logic outputs to convert the "n" first-type instructions directed thereto into "p" (p≧n) second-type instructions to which the "n" first-type instructions map, wherein the first-type instructions map to particular sets of one or more second-type instructions in accordance with a predefined first-type to second-type mapping; and
   dispatch logic coupled to the conversion paths to dispatch the "p" second-type for execution.

2. An apparatus as in claim 1 wherein the distribution logic includes multiplexer logic coupled between the instruction queue and the distribution logic outputs to direct information from a single first-type instruction to a number of the distribution logic outputs equal to a number of the second-type instructions to which the single first-type instruction maps.

3. An apparatus as in claim 1 wherein the conversion paths are coupled to simultaneously convert at least one first-type instruction that maps to at least two second-type instructions in accordance with the predefined first-type to second-type mapping.

4. An apparatus as in claim 1 wherein the conversion paths are coupled to convert plural first-type instructions that each map to at least two second-type instructions.

5. An apparatus as in claim 1, wherein at least some of the first-type instructions map to corresponding sets of at least two of the second-type instructions.

6. An apparatus as in claim 1, wherein the first-type instructions comprise Complex Instruction Set Computer ("CISC") instructions.

7. An apparatus as in claim 1, wherein the first-type instructions comprise x86 instructions.

8. An apparatus as in claim 1, wherein the second-type instructions comprise RISC-like operations ("ROPs").

9. An apparatus comprising:
   an instruction queue including storage for a plurality of CISC instructions, wherein the CISC instructions map to one or more RISC-like operations ("ROPs") in accordance with a predefined CISC instruction to ROP mapping;
   a multiplexer coupled to the instruction queue and responsive to predecode information indicative of a mapping number of ROPs to which an associated one of the CISC instruction maps, the multiplexer having a plurality "m" of outputs to direct information from ones of the CISC instructions to mapping numbers of the multiplexer outputs, up to "m" CISC instructions; and
   a plurality "m" of CISC instruction to ROP conversion paths, each conversion path coupled to a respective multiplexer output to convert a CISC instruction directed thereto to a respective one of the ROPs to which the CISC instruction maps.

10. An apparatus as in claim 9, wherein the instruction queue includes storage for the predecode information.

11. An apparatus as in claim 9, further comprising dispatch logic coupled to the conversion paths to dispatch ROPs converted thereby to a RISC processor, in parallel.

12. A method of decoding plural complex instruction set computer ("CISC") instructions into plural RISC-ike operations ("ROPs") for parallel dispatch to a superscalar processor core, the method comprising:
   storing a plurality, "n" or greater, of the CISC instructions in an instruction queue;
   selectively routing "n" of the CISC instructions to a plurality "p" (p>n) of dispatch positions in accordance with predefined mappings of each of the "n" CISC instructions to one or more corresponding ROPs;
   converting, simultaneously for each of the dispatch positions, each of the "n" instructions into the corresponding one or more ROPs, wherein at least one of the "n" CISC instructions is converted to at least two corresponding ROPs, and wherein the simultaneously converted ROPs total "p" (p>n);
   driving the "p" converted ROPs from the "p" dispatch positions in parallel to the superscalar processor core.

13. A method as in claim 12, further comprising:

directing information from each of the "n" CISC instructions to mapping numbers of conversion paths in response to predecode information indicative of a particular mapping number of ROPs to which an associated one of the "n" CISC instruction maps.

14. A method comprising, directing information from each of plural complex instruction set computer ("CISC") instructions to conversion paths;

simultaneously converting the plural CISC instructions along the conversion paths and supplying plural RISC-like operations ("ROPs") in accordance with a predefined mapping of each of the CISC instructions to corresponding of the ROPs, wherein at least one of the plural CISC instructions so converted maps to a set of plural of the supplied ROPs.

15. A method as recited in claim 14, further comprising:

dispatching the supplied ROPs, in parallel, to reservation station logic associated with execution units of a processor core.

16. A method as recited in claim 14, further comprising:

dispatching the supplied ROPs, in parallel, to a superscalar processor core.

17. A method as recited in claim 14, wherein a first CISC instructions converted by a first subset of the conversion paths maps to plural of the supplied ROPs; and wherein at least a second CISC instruction converted by a second subset of the conversion paths maps to a single of the supplied ROPs, the first and the second subsets simultaneously converting respective CISC instructions.

18. An apparatus for decoding CISC instructions into RISC-like operations ("ROPs") for dispatch to a RISC processor, wherein the CISC instructions map to respective numbers of ROPs in accordance with a predefined CISC instruction to ROP mapping, the apparatus comprising:

means for aligning CISC opcodes and addressing information of the CISC instructions into dispatch positions based on the numbers of ROPs to which the CISC instructions map;

means for decoding the CISC opcodes and addressing information into ROP opcodes and addressing information based on, for each CISC instruction, the position of the dispatch position decoding the CISC instruction relative to other dispatch positions decoding the same CISC instruction; and means for driving the ROP opcodes and addressing information from the dispatch positions in parallel to the RISC processor.

19. An instruction path for a complex instruction set computer ("CISC") processor having a reduced instruction set computer ("RISC") superscalar core, instruction path comprising:

a plurality of dispatch positions;

distribution logic coupled to an instruction store to direct a first CISC instruction, which maps to a sequence of one or more RISC-like operations ("ROPs") in accordance with a predefined CISC instruction to ROP mapping, to a selectively-determined subset of the dispatch positions, in parallel; means associated with each of the subset of dispatch positions for converting a CISC instruction directed thereto into a respective one of the ROPs of the ROP sequence, in parallel; and means for dispatching converted ROPs to the superscalar RISC core, in parallel.

20. A processor comprising:

a queue having a head-of-queue position and containing and instruction at the head-of-queue position, the head-of-queue instruction being a first-type instruction having a first type opcode and first-to-second type opcode mapping indicia;

an instruction decoder comprising:

a multiplexer coupled to the queue; and a plurality of first-to-second type opcode converters having an hierarchical relationship with one another, a first subset of the first-to-second type opcode converters of a size determined by the mapping indicia of the head-of-queue instruction being coupled by the multiplexer to the first type opcode of the head-of-queue instruction; and a superscalar processor core having a plurality of hierarchical second-type instruction inputs respectively coupled to outputs of the first-to-second type opcode converters in accordance with the hierarchy thereof.

21. A processor as in claim 20:

wherein the superscalar processor core comprises a RISC-ike processor core;

wherein the first-type instructions comprise predecoded x86 instructions; and wherein the second-type instructions comprise RISC-like operations ("ROPs").

22. A processor as in claim 20 wherein each first-type opcode maps to a number of one or more second-type opcodes, the mapping indicia being, for a particular first type opcode, the number of second type opcodes to which the particular opcode maps.

23. A computer system as in claim 20 wherein the head-of-queue instruction further includes an opcode marker, the first subset of first-to-second type opcode converters being coupled by the multiplexer in accordance with the opcode marker to the first type opcode of the head-of-queue instruction.

24. A processor as in claim 23 wherein the opcode marker is a bit.

25. A processor as in claim 24 wherein the opcode marker bit is maintained in a bit array component of the queue.

26. A processor as in claim 23 wherein the queue comprises a plurality of component queues, including a first type instruction queue, an opcode marker queue, and a mapping indicia queue.

27. A processor as in claim 26 wherein the first type instruction queue is an 8×16 bit queue, the opcode marker queue is a 1×16 bit queue, and the mapping indicia queue is a 2×16 bit queue.

28. A processor as in claim 20 wherein the queue further contains a next-in-queue instruction following the head-of-queue instruction, the next-in-queue instruction being a first type instruction having a first type opcode and first-to-second type opcode mapping indicia, and a second subset of the type opcode converters of a size determined by the mapping indicia of the next-in-queue instruction being coupled by the multiplexer to the first type opcode of the next-in-queue instruction, the second subset of type opcode converters being exclusive of the first subset of converters and a higher hierarchical order.

29. A computer system comprising the processor of claim 20 and a memory coupled to the queue of the processor, the memory containing a program sequence of x86 instructions.

30. An instruction decoder comprising:
a plurality of hierarchically-araanged first type instruction inputs, each comprising a first type opcode input field, an opcode marker input field, and a first-to-second type opcode mapping indicia input field;
a switch array having inputs coupled to the opcode input fields;
a plurality of first-to-second type opcode converters having inputs coupled to outputs of the switch array; and
control logic having inputs coupled to the opcode marker input fields and the mapping indicia input fields, the control logic having an output coupled to the switch array and being responsive to values in the opcode marker input fields and the mapping indicia input fields to couple a lowest ordered opcode input field of the switch array having an asserted value in the opcode marker field to a first subset of the first-to-second type opcode converters through the switch array, the first subset of the first-to-second type opcode converters having a size determined by the mapping indicia input field of the lowest order instruction input.

31. An instruction decoder as in claim 30 wherein the control logic is further responsive to values in the opcode marker input fields and the mapping indicia input fields to couple a second-lowest ordered opcode input field of the switch array having an asserted value in the opcode marker field to a second subset of the type opcode converters through the switch array, the second subset of type opcode converters having a size determined by the mapping indicia input field of the second-lowest order instruction input when the plurality of first-to-second type opcode converters is not fewer than the mapping indicia input field of the lowest order instruction input plus the mapping indicia input field of the second-lowest order instruction input.

32. An instruction decoder as in claim 30 wherein the control logic is further responsive to values in the opcode marker input fields and the mapping indicia input fields to couple a third-lowest ordered opcode input field of the switch array having an asserted value in the opcode marker field to a third subset of the type opcode converters through the switch array, the third subset of type opcode converters having a size determined by the mapping indicia input field and the third-lowest order instruction input when the plurality of first-to-second type opcode converters is not fewer than the mapping indicia input field of the lowest order instruction input plus the mapping indicia input field of the second-lowest order instruction input plus the mapping indicia input field of the third-lowest order instruction input.

33. An instruction path as in claim 19,
wherein the distribution logic further directs a second CISC instruction which maps to a single ROP to a single selectively-determined additional one of the dispatch positions; and
wherein the instruction path further comprises means associated with the additional one of the dispatch positions for converting a CISC instruction directed thereto into the single ROP.

34. An instruction path as in claim 33, wherein the distribution logic comprises multiplexing logic coupled between the instruction store and conversion means associated with each of the dispatch positions, including the first subset and the single additional dispatch position, to selectively direct information from particular CISC instructions in the instruction store to unallocated ones of the dispatch positions in accordance with predefined numbers of ROPs to which the particular CISC instructions map.

* * * * *